United States Patent
Seo et al.

(10) Patent No.: US 8,582,419 B2
(45) Date of Patent: Nov. 12, 2013

(54) METHOD AND APPARATUS FOR TRANSMITTING SIGNAL IN WIRELESS COMMUNICATION SYSTEM

(75) Inventors: Han Byul Seo, Anyang-si (KR); Byoung Hoon Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/133,144

(22) PCT Filed: Dec. 28, 2009

(86) PCT No.: PCT/KR2009/007830
§ 371 (c)(1),
(2), (4) Date: Jun. 6, 2011

(87) PCT Pub. No.: WO2010/077038
PCT Pub. Date: Jul. 8, 2010

(65) Prior Publication Data
US 2011/0250897 A1 Oct. 13, 2011

Related U.S. Application Data

(60) Provisional application No. 61/141,212, filed on Dec. 29, 2008.

(30) Foreign Application Priority Data

Aug. 14, 2009 (KR) .......................... 10-2009-0075227

(51) Int. Cl.
*H04J 11/00* (2006.01)
(52) U.S. Cl.
USPC .......................................................... 370/208
(58) Field of Classification Search
USPC ........... 370/203–271, 310–394, 395.1, 395.3, 370/395.4, 395.41, 395.42, 395.5, 395.52, 370/395.53, 412–421, 431–529
See application file for complete search history.

(56) References Cited

U.S. PATENT DOCUMENTS

2007/0076583 A1* 4/2007 Hadad ........................... 370/203
2007/0281613 A1 12/2007 Lee et al.
(Continued)

FOREIGN PATENT DOCUMENTS

CN 101141171 3/2008
CN 101227220 7/2008
(Continued)

OTHER PUBLICATIONS

LG Electronics, "Resource Allocation and Downlink Control Channel Structure for Relay Backhaul Link", 3GPP TSG RAN WG1 Meeting #56bis, R1-091194, Mar. 2009, 7 pages.
(Continued)

*Primary Examiner* — Jung-Jen Liu
(74) *Attorney, Agent, or Firm* — Lee, Hong, Degerman, Kang & Waimey

(57) ABSTRACT

A method of transmitting a signal of a base station in a wireless communication system is provided. The method includes transmitting a first signal to the relay station through the transmission period in a subframe including a transmission period and a guard time for transmission/reception switching of a relay station, and transmitting a second signal to a macro user equipment through the guard time. Accordingly, a signal can be effectively transmitted in the wireless communication system employing the relay station.

8 Claims, 23 Drawing Sheets

(56) References Cited

U.S. PATENT DOCUMENTS

| | | | |
|---|---|---|---|
| 2008/0043815 A1 | 2/2008 | Hart et al. | |
| 2008/0081626 A1 | 4/2008 | Choi et al. | |
| 2008/0095037 A1* | 4/2008 | Chang et al. | 370/204 |
| 2008/0159217 A1 | 7/2008 | Chang et al. | |
| 2008/0220790 A1* | 9/2008 | Cai et al. | 455/450 |
| 2008/0220799 A1* | 9/2008 | Tsai et al. | 455/509 |
| 2010/0120442 A1* | 5/2010 | Zhuang et al. | 455/450 |
| 2010/0136997 A1* | 6/2010 | Palanki et al. | 455/452.1 |
| 2010/0232546 A1* | 9/2010 | Yu et al. | 375/300 |
| 2011/0194412 A1* | 8/2011 | Park et al. | 370/241 |
| 2011/0250897 A1* | 10/2011 | Seo et al. | 455/445 |

FOREIGN PATENT DOCUMENTS

| | | |
|---|---|---|
| JP | 2008-048420 | 2/2008 |
| JP | 2011-534522 | 3/2012 |
| JP | 5184703 | 4/2013 |
| WO | 2007120023 | 10/2007 |

OTHER PUBLICATIONS

Texas Instruments, "Decode and Forward Relays for E-Utra enhancements", 3GPP TSG RAN WG1 #55, R1-084446, Nov. 2008, 5 pages.

Qualcomm Europe, "Support of Rel-8 UEs by LTE-A Relays", 3GPP RAN WG1#55, R1-084384, Nov. 2008, 20 pages.

Motorola, "LTE signaling to support Relay operation", 3GPP TSG RAN WG1 Meeting #55, R1-084412, Nov. 2008, 6 pages.

In the Japanese Patent Office Application No. 2011-540616, Office Action dated Nov. 6, 2012, 4 pages.

Japan Patent Office Application Serial No. 2011-540616, Office Action dated May 14, 2013, 2 pages.

The State Intellectual Property Office of the People's Republic of China Application Serial No. 200980153091.X, Office Action dated Jun. 28, 2013, 11 pages.

* cited by examiner

Fig. 28

| Subframe | 0 | 1 | 2 | 3 | 4 | 5 | 6 | 7 | 8 | 9 |
|---|---|---|---|---|---|---|---|---|---|---|
| UL (BS) | Listen to UE | Listen to UE | Listen to UE | Listen to UE | To RS | Listen to UE | Listen to UE | Listen to UE | Listen to RS | Listen to UE |
| UL (Macro UE) | To BS | To BS | To BS | To BS | No UL grant | To BS | To BS | To BS | To BS** | To BS |
| UL (RN) | Listen to UE | Listen to UE | Listen to UE | Listen to UE | BS | Listen to UE | Listen to UE | Listen to UE | To BS | Listen to UE |
| UL (Relay UE) | To RS | To RS | To RS | To RS | To RS* | To RS | To RS | To RS | No UL grant | To RS |

↙ Swapped subframe (at position 4)

\* It should be orthogonal to the BS's transmission.
\*\* It should be orthogonal to the RS's transmission.

METHOD AND APPARATUS FOR TRANSMITTING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2009/007830, filed on Dec. 28, 2009, which claims the benefit of earlier filing date and right of priority to Korean Application No. 10-2009-0075227, filed on Aug. 14, 2009, and also claims the benefit of U.S. Provisional Application Ser. No. 61/141,212, filed on Dec. 29, 2008, the contents of which are all hereby incorporated by reference herein in their entirety.

TECHNICAL FIELD

The present invention relates to wireless communications, and more particularly, to a method of transmitting a signal in a wireless communication system employing a relay station.

BACKGROUND ART

Standardization works of international mobile telecommunication (IMT)-advanced which is a next generation (i.e., post $3^{rd}$ generation) mobile communication system are carried out in the international telecommunication union radio communication sector (ITU-R). The IMT-advanced aims at support of an Internet protocol (IP)-based multimedia service with a data transfer rate of 1 Gbps in a stationary or slowly moving state or 100 Mbps in a fast moving state.

$3^{rd}$ generation partnership project (3GPP) is a system standard satisfying requirements of the IMT-advanced, and prepares LTE-advanced which is an improved version of long term evolution (LTE) based on orthogonal frequency division multiple access (OFDMA)/single carrier-frequency division multiple access (SC-FDMA) transmission. The LTE-advanced is one of promising candidates for the IMT-advanced. Technology related to a relay station is one of main technologies for the LTE-advanced.

A relay station (RS) is a device for relaying a signal between a base station (BS) and a user equipment (UE), and is used for cell coverage extension and throughput enhancement of a wireless communication system.

Many researches for a method of transmitting a signal between the BS and the RS are currently ongoing in the wireless communication employing the RS. A conventional method of transmitting a signal between the BS and the UE has a problem when a signal is transmitted between the BS and the RS.

In the conventional method of transmitting the signal between the BS and the UE, the UE transmits the signal through one entire subframe in a time domain. One reason of transmitting a signal by the UE through the entire subframe is to set a duration of each channel for transmitting a signal to the maximum extent possible in order to reduce instantaneous maximum power consumed by the UE.

However, there is a case where the RS cannot transmit or receive a signal through one entire subframe from the perspective of the time domain. In general, the RS relays a signal with respect to a plurality of UEs, which results in frequent occurrence of switching between a reception (Rx) mode and a transmission (Tx) mode. The switching between the Rx mode and the Tx mode requires a specific time (hereinafter referred to as a guard time) between an Rx-mode period and a Tx-mode period. During the guard time, the RS does not transmit or receive a signal in order to avoid inter-signal interference and to provide reliable operations.

Due to the guard time, the RS may not be able to transmit or receive a signal through the entire subframe unlike in the UE. In this case, the conventional method of transmitting a signal between the BS and the UE cannot be directly used.

In addition, the conventional method of transmitting a signal between the BS and the UE does not have to be directly used to transmit a signal between the BS and the RS in a sense that the RS is less restrictive in terms of power than the UE and that a channel state with respect to the BS is good in general.

Accordingly, there is a need for a new method of transmitting a signal in a wireless communication system employing an RS.

DISCLOSURE OF INVENTION

Technical Problem

The object of the present invention is to provide a method of transmitting a signal in a wireless communication system employing a relay station.

Solution to Problem

According to an aspect of the present invention, there is provided a method of transmitting a signal of a base station in a wireless communication system, the method including: in a subframe including a transmission period and a guard time for transmission/reception switching of a relay station, transmitting a first signal to the relay station through the transmission period; and transmitting a second signal to a macro user equipment through the guard time.

According to another aspect of the present invention, there is provided a method of transmitting a signal by a base station to a relay station in a wireless communication system, the method including: splitting a subframe including a transmission period and a guard time in a time domain into a first frequency band and a second frequency in a frequency domain; transmitting radio resource allocation information to the relay station through the transmission period belonging to the first frequency band; and transmitting user data to the relay station through the transmission period belonging to the second frequency band indicated by the radio resource allocation information.

According to another aspect of the present invention, there is provided a method of transmitting a signal of a relay station in a wireless communication system, the method including: receiving radio resource allocation information from a base station; generating a multiplexed signal by multiplexing control information and user data; and transmitting the multiplexed signal by using a radio resource indicated by the radio resource allocation information in a subframe, wherein the subframe includes a transmission period and a guard time for transmission/reception switching of the relay station in a time domain, and the radio resource is included in the transmission period.

According to another aspect of the present invention, there is provided a relay station including: a radio frequency (RF) unit for transmitting and receiving a radio signal; and a processor coupled to the RF unit, wherein the processor receives radio resource allocation information, generates a multiplexed signal by multiplexing control information and user data, and transmits the multiplexed signal by using a radio resource indicated by the radio resource allocation information in a subframe, and the subframe includes a transmission period and a guard time for transmission/reception switching of the relay station in a time domain and the radio resource is included in the transmission period.

According to another aspect of the present invention, there is provided a base station including: an RF unit for transmitting and receiving a radio signal; and a processor coupled to the RF unit, wherein, in a subframe including a transmission period and a guard time for transmission/reception switching of a relay station, the processor uses the RF unit to transmit a first signal to the relay station through the transmission period and to transmit a second signal to a macro user equipment through the guard time.

According to another aspect of the present invention, there is provided a base station including: an RF unit for transmitting and receiving a radio signal; and a processor coupled to the RF unit, wherein the processor splits a subframe including a transmission period and a guard time in a time domain into a first frequency band and a second frequency in a frequency domain, transmits radio resource allocation information to the relay station through the transmission period belonging to the first frequency band, and transmits user data to the relay station through the transmission period belonging to the second frequency band indicated by the radio resource allocation information.

Advantageous Effects of Invention

According to the present invention, a signal can be effectively transmitted in a wireless communication system employing a relay station.

BRIEF DESCRIPTION OF DRAWINGS

FIG. 28 shows an example of uplink/downlink band swapping.

MODE FOR THE INVENTION

Long term evolution (LTE) of the $3^{rd}$ generation partnership project (3GPP) standard organization is a part of an evolved-universal mobile telecommunications system (E-UMTS) using an evolved-universal terrestrial radio access network (E-UTRAN). The LTE employs an orthogonal frequency division multiple access (OFDMA) in a downlink and employs single carrier-frequency division multiplex access (SC-FDMA) in an uplink. LTE-advance (LTE-A) is an evolution of the LTE. For clarity, the following description will focus on the 3GPP LTE/LTE-A. However, technical features of the present invention are not limited thereto.

Figure 1:
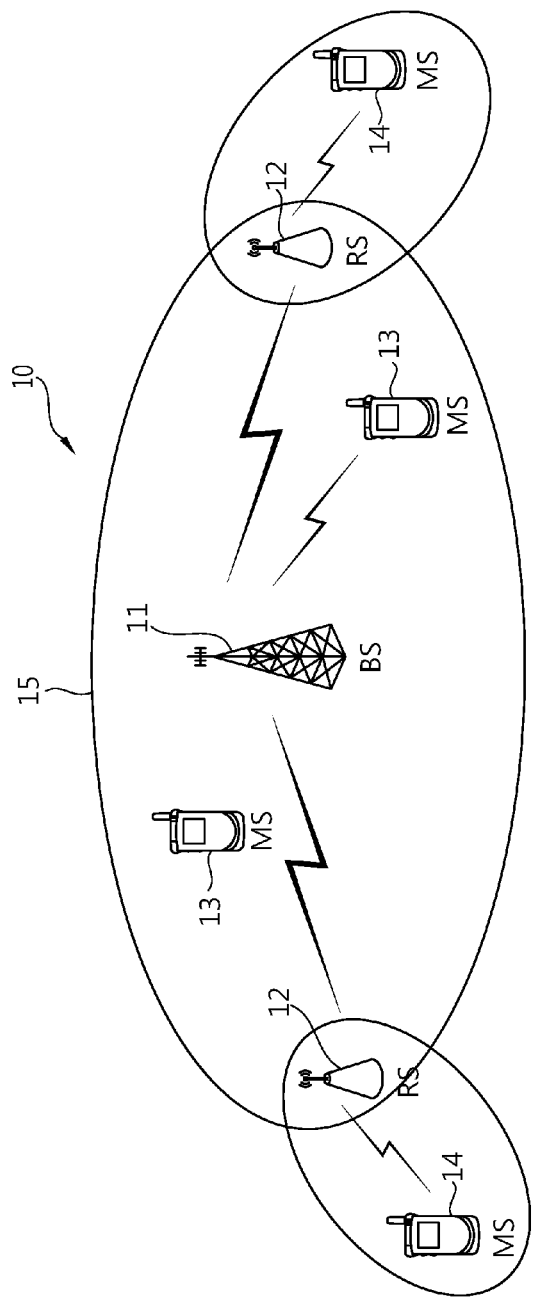
FIG. 1 is a wireless communication system employing a relay station (RS).

FIG. 1 is a wireless communication system employing a relay station (RS).

Referring to FIG. 1, a wireless communication system 10 employing an RS 12 includes at least one base station (BS) 11. Each BS 11 provides a communication service to a specific geographical region 15 generally referred to as a cell. The cell can be divided into a plurality of regions, and each region can be referred to as a sector. One or more cells may exist in the coverage of one BS. The BS 11 is generally a fixed station that communicates with a user equipment (UE) 13 and may be referred to as another terminology, such as an evolved node-B (eNB), a base transceiver system (BTS), an access point, etc. The BS 11 can perform functions such as connectivity between the RS 12 and a UE 14, management, control, resource allocation, etc.

The RS 12 is a device for relaying a signal between the BS 11 and the UE 14, and is also referred to as another terminology such as a relay node (RN), a repeater, a relay, etc. A relay scheme used in the RS may be either amplify and forward (AF) or decode and forward (DF), and the technical features of the present invention are not limited thereto.

The UEs 13 and 14 may be fixed or mobile, and may be referred to as another terminology, such as a mobile station (MS), a user terminal (UT), a subscriber station (SS), a wireless device, a personal digital assistant (PDA), a wireless modem, a handheld device, etc. Hereinafter, a macro UE (i.e., Ma UE) 13 denotes a UE that directly communicates with the BS 11, and a relay UE (i.e., Re UE) 14 denotes a UE that communicates with the RS. Even if the macro UE 13 exists in a cell of the BS 11, the macro UE 13 can communicate with the BS 11 via the RS 12 to improve a data rate depending on a diversity effect.

Hereinafter, a downlink (DL) denotes communication from the BS 11 to the Ma UE 13, and an uplink (UL) denotes communication from the Ma UE 13 to the BS 11. A backhaul DL denotes communication from the BS 11 to the RS 12. A backhaul UL denotes communication from the RS 12 to the BS 11.

The wireless communication system 10 employing the RS 12 is a system supporting bidirectional communication. The bidirectional communication may be performed by using a time division duplex (TDD) mode, a frequency division duplex (FDD) mode, etc. When in the TDD mode, UL transmission and DL transmission use different time resources, and backhaul UL transmission and backhaul DL transmission use different time resources. When in the FDD mode, UL transmission and DL transmission use different frequency resources, and backhaul UL transmission and backhaul DL transmission use different frequency resources.

Figure 2:
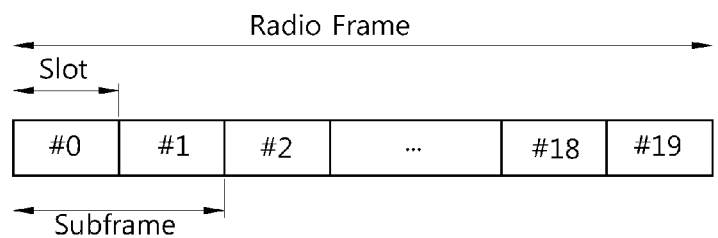
FIG. 2 shows a radio frame structure in a $3^{rd}$ generation partnership project (3GPP) long term evolution (LTE) frequency division duplex (FDD) mode.

FIG. 2 shows a radio frame structure in a 3GPP LTE FDD mode.

Referring to FIG. 2, a radio frame consists of 10 subframes, and one subframe consists of two slots. A transmission time interval (TTI) is defined as a time for transmitting one subframe. For example, one subframe may have a length of 1 millisecond (ms), and one slot may have a length of 0.5 ms.

Figure 3:
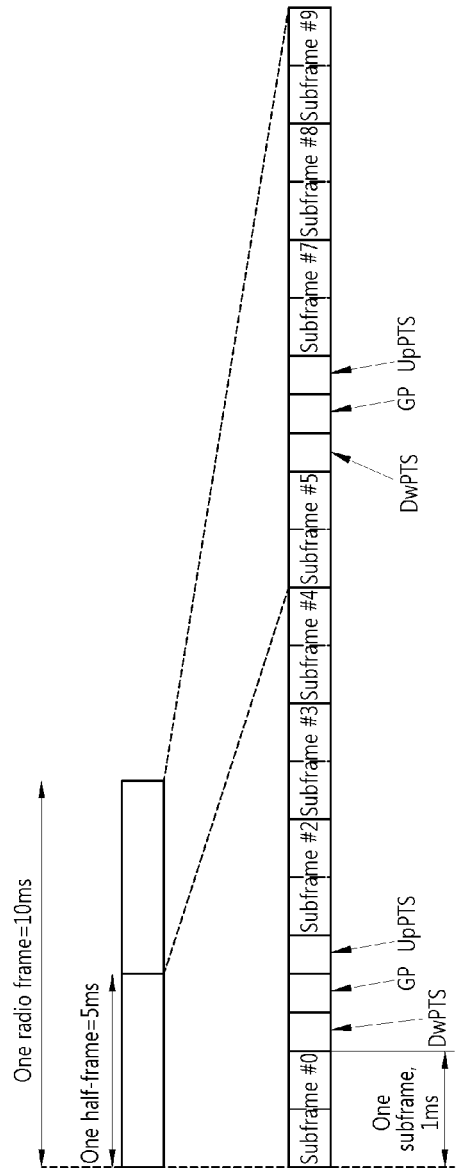
FIG. 3 shows a radio frame structure in a 3GPP LTE time division duplex (TDD) mode.

FIG. 3 shows a radio frame structure in a 3GPP LTE TDD mode.

Referring to FIG. 3, one radio frame has a length of 10 ms and consists of two half-frames each having a length of 5 ms. One half-frame consists of five subframes each having a length of 1 ms. Each subframe is used as any one of an uplink (UL) subframe, a downlink (DL) subframe, and a special subframe. One radio frame includes at least one UL subframe and at least one DL subframe. One subframe consists of two slots. For example, one subframe may have a length of 1 ms, and one slot may have a length of 0.5 ms.

The special subframe is a specific period located between the UL subframe and the DL subframe to separate a UL and a DL. One radio frame includes at least one special subframe. The special subframe includes a downlink pilot time slot (DwPTS), a guard period (GP), and an uplink pilot time slot (UpPTS). The DwPTS is used for initial cell search, synchronization, or channel estimation. The UpPTS is used for channel estimation in a BS and UL transmission synchronization of a UE. The GP is used to remove interference that occurs between the UL and the DL due to a multi-path delay of a signal. The GP may be included in a guard time.

The radio frame structure is for exemplary purposes only, and thus the number of subframes included in the radio frame, the number of slots included in the subframe, or the number of orthogonal frequency division multiplexing (OFDM) symbols included in the slot may change variously.

The section 4.1 of 3GPP TS 36.211 V8.3.0 (2008-05) "Technical Specification Group Radio Access Network; Evolved Universal Terrestrial Radio Access (E-UTRA); Physical Channels and Modulation (Release 8)" may be incorporated herein by reference for the purpose of explaining the radio frame structure described with reference to FIG. 2 and FIG. 3.

In FDD and TDD radio frames, one slot includes a plurality of OFDM symbols in a time domain and a plurality of resource blocks (RBs) in a frequency domain. The OFDM symbol is for expressing one symbol period since the 3GPP LTE uses OFDMA in a DL. According to a multiple access scheme, the OFDM symbol may be referred to as an SC-FDMA symbol or a symbol period. An RB is a resource allocation unit, and includes a plurality of consecutive subcarriers in one slot.

Figure 4:
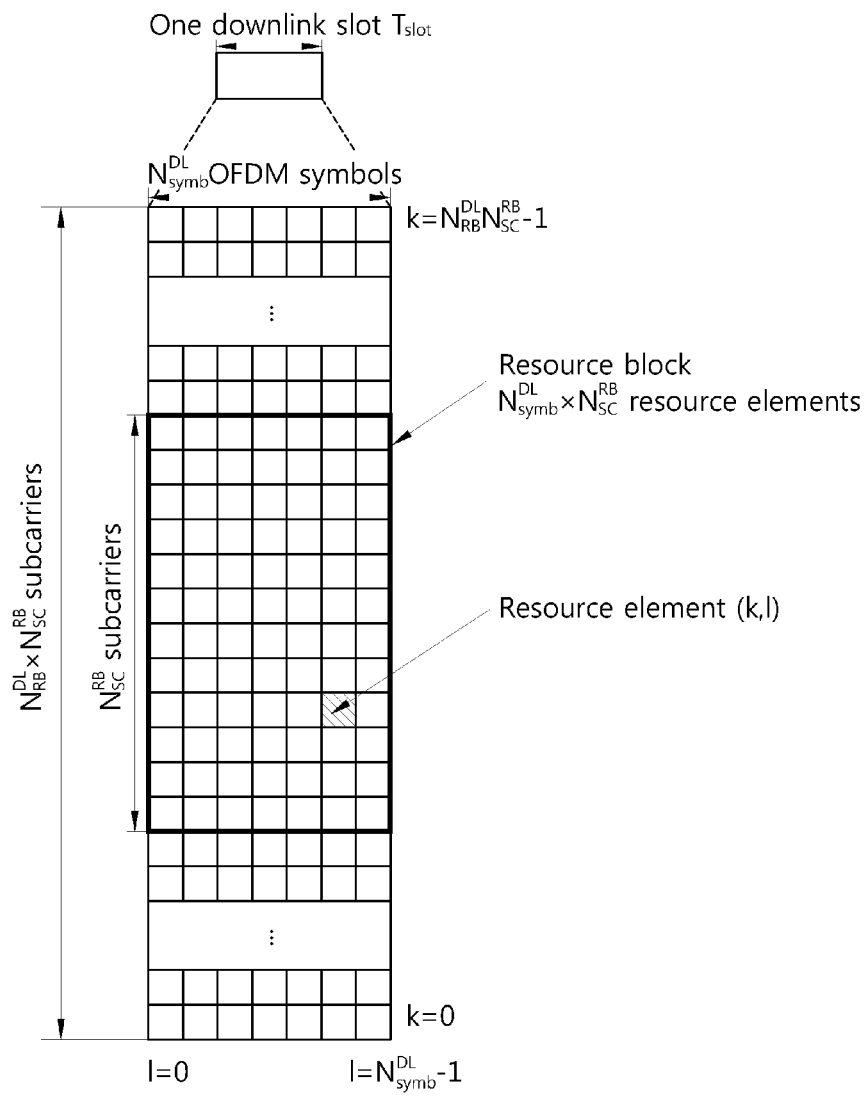
FIG. 4 shows an example of a resource grid for one downlink slot.

FIG. 4 shows an example of a resource grid for one DL slot.

Referring to FIG. 4, a DL slot includes $N^{DL}_{symb}$ OFDM symbols in a time domain. One resource block includes $NRB^{RB}_{sc}$ subcarriers in a frequency domain. $N^{DL}_{symb}$ may be 7 when using a normal cyclic prefix, and may be 6 when using an extended cyclic prefix. The number of OFDM symbols and the number of subcarriers for the resource block can be summarized by Table 1 below.

TABLE 1

| Configuration | $N^{RB}_{sc}$ | $N^{DL}_{symb}$ |
|---|---|---|
| Normal cyclic prefix | 12 | 7 |
| Extended cyclic prefix | 12 | 6 |

One subframe includes 14 OFDM symbols when using the normal cyclic prefix, and includes 12 OFDM symbols when using the extended cyclic prefix.

Each element on the resource grid is referred to as a resource element. The number $N^{DL}_{RB}$ of RBs included in the DL slot depends on a DL transmission bandwidth determined in a cell. The values $N^{DL}_{symb}$ and $N^{RB}_{sc}$ are for exemplary purposes only, and the present invention is not limited thereto.

Figure 5:
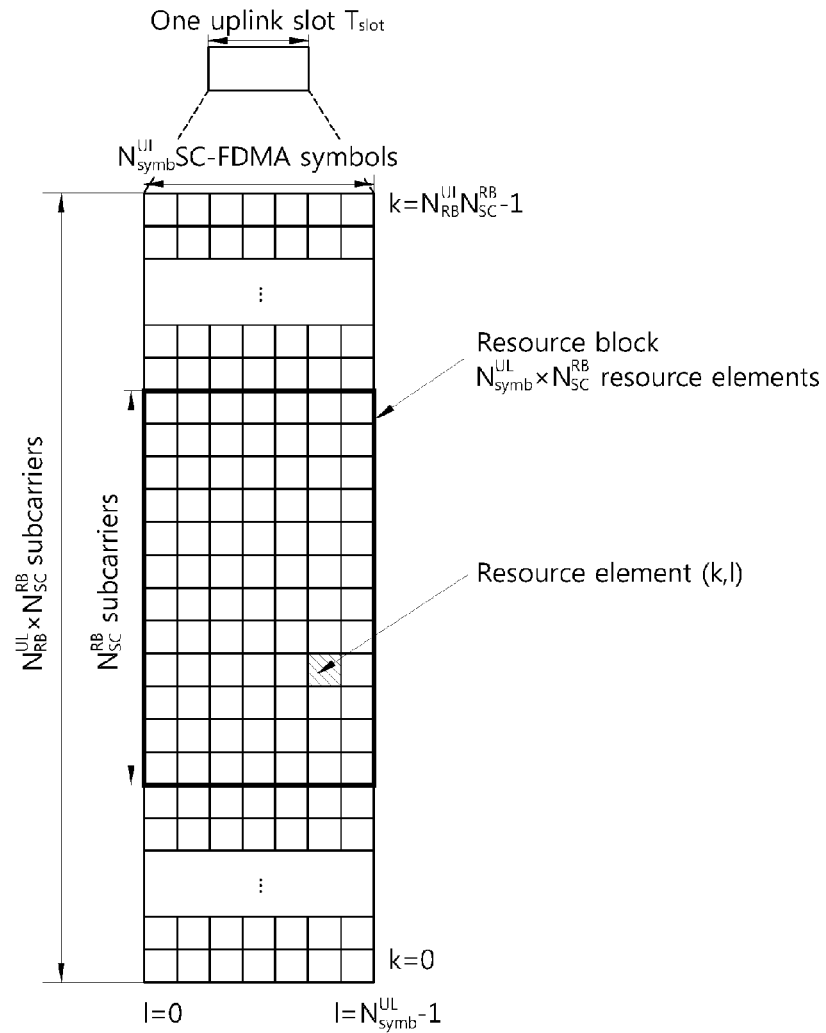
FIG. 5 shows an example of a resource grid for one uplink slot.

FIG. 5 shows an example of a resource grid for one UL slot.

Referring to FIG. 5, a UL slot includes $N^{UL}_{symb}$ SC-FDMA or OFDM symbols in a time domain, and includes a plurality of RBs in a frequency domain. Each RB includes $N^{RB}_{sc}$ (e.g., 12) subcarriers. $N^{UL}_{symb}$ may be 7 when using a normal cyclic prefix, and may be 6 when using an extended cyclic prefix. One subframe may include 14 SC-FDMA or OFDM symbols when using the normal cyclic prefix, and may include 12 SC-FDMA or OFDM symbols when using the extended cyclic prefix. Although it is described that $N^{RB}_{sc}$ is 12 in one RB for example, the present invention is not limited thereto. The number $N^{UL}_{RB}$ of RBs included in the UL slot depends on a UL transmission bandwidth determined in a cell.

Figure 6:
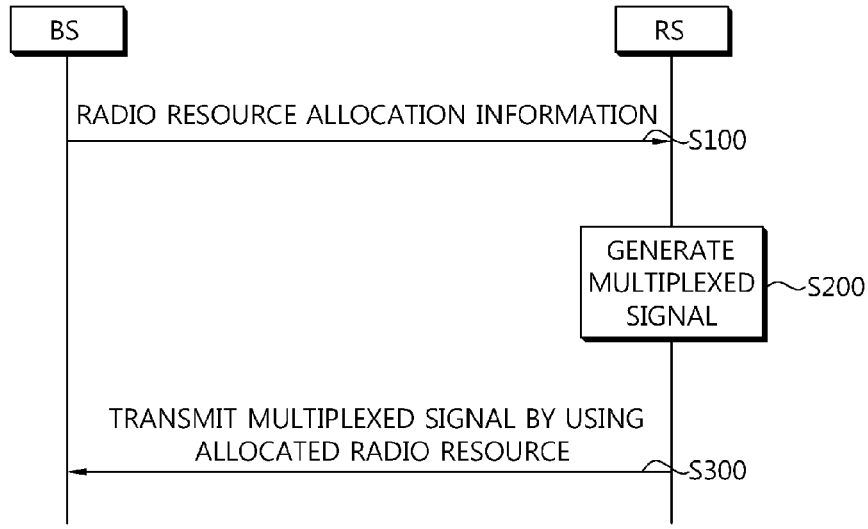
FIG. 6 is a flowchart showing a method of transmitting a signal of an RS in a wireless communication system employing the RS.

FIG. 6 is a flowchart showing a method of transmitting a signal of an RS in a wireless communication system employing the RS. Referring to FIG. 6, the RS first receives radio resource allocation information from a BS (step S100). Radio resources allocated by the radio resource allocation information will be described below in detail.

The RS generates a multiplexed signal by multiplexing control information and data (step S200). The control information may imply a communication control related signal such as acknowledgment (ACK)/negative ACK (NACK) to be transmitted by the RS to the BS, a scheduling request signal, channel quality information (CQI), a buffer status report (BSR), etc. The data may imply a signal other than the control information, for example, may imply user data.

The RS may configure each of the control information and the data into a control packet and a data packet, and may configure an aggregate packet which is an aggregation of the packets. The RS may multiplex the control packet and the data packet to generate a multiplexed signal. Alternatively, the RS may multiplex the aggregate packet to generate a multiplexed signal.

Figure 7:
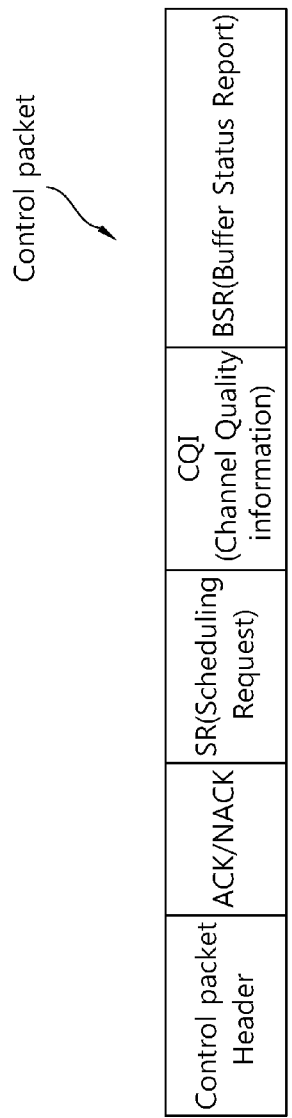
FIG. 7 shows an example of configuring a control packet.
Figure 8:
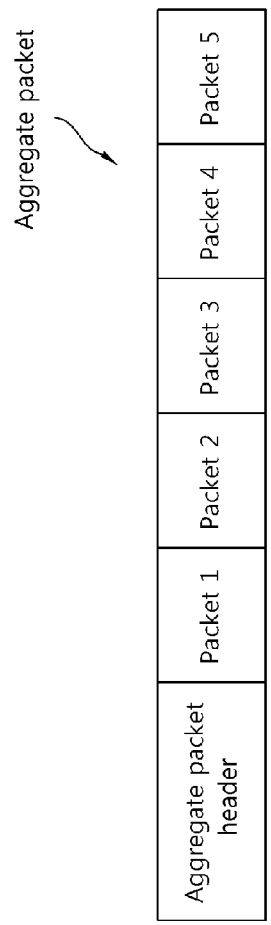
FIG. 8 shows an example of configuring an aggregate packet.

FIG. 7 shows an example of configuring a control packet.
FIG. 8 shows an example of configuring an aggregate packet.

Referring to FIG. 7, the control packet may include a control packet header, ACK/NACK, a scheduling request (SR) signal, channel quality information (CQI), and a buffer status report (BSR). In this case, the ACK/NACK may be expressed by a bitmap to indicate whether several packets transmitted by a BS to an RS are successfully received. For example, if the BS has transmitted packets 1 to 5 in previous subframes and an error occurs in the packet 4, the bitmap can be expressed by 11101. Of course, the bitmap can also be expressed in an opposite manner, that is, 00010.

Referring to FIG. 8, an aggregate packet may include an aggregate packet header and a plurality of packets. The aggregate packet header may be set to a fixed length, or may be set in a semi-static manner such that the aggregate packet header is set to a predetermined length until a change signal is received and then changes its length according to the change signal when the change signal is received.

A plurality of packets (i.e., packets 1 to 5) included in the aggregate packet may be control packets or data packets. The plurality of packets may be transmitted to the same UE, or may be transmitted to different UEs. Each of the plurality of packets may use a different modulation and coding scheme according to reliability, requirements on delay, whether the packet needs to be retransmitted or not, and so on. The aggregate packet header may include information regarding a modulation and coding scheme for the plurality of packets (i.e., packets 1 to 5). The control packet and the aggregate packet shown in FIG. 7 or FIG. 8 are for exemplary purposes only, and thus various modifications can be made.

Referring back to FIG. 6, the RS transmits the multiplexed signal by using a radio resource indicated by the resource allocation information in a subframe (step S300).

Figure 9:
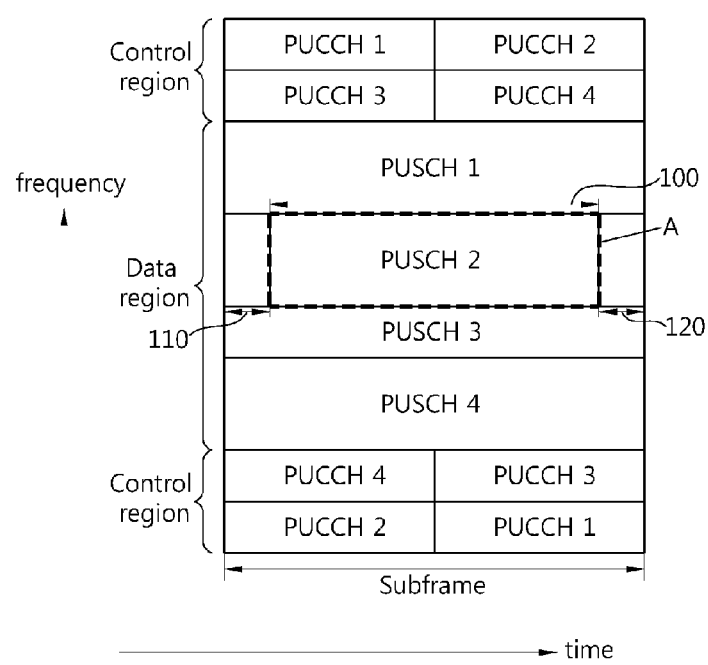
FIG. 9 shows an example of allocating a radio resource by a base station (BS) to an RS and a user equipment (UE).

FIG. 9 shows an example of allocating a radio resource by a BS to an RS and a UE.

Referring to FIG. 9, a subframe can be split into a control region and a data region. The control region is allocated with a physical uplink control channel (PUCCH) for carrying uplink control information. The data region is allocated with a physical uplink shared channel (PUSCH) for carrying user data.

Radio resources indicated by PUCCHs 1 to 4 in the control region can be used by a macro UE to carry an uplink control related signal to a BS. Examples of the uplink control related signal include a channel quality indicator (CQI), hybrid automatic repeat request (HARM) ACK/NACK, etc. Each of radio resources indicated by any one of PUSCHs 1 to 4 in the data region is allocated to an RS or the macro UE and is used to transmit a signal to the BS.

For example, a radio resource indicated by the PUSCH 2 may be allocated to the RS. The radio resource allocated to the RS includes a transmission period 100 and guard times 110 and 120 for transmission (Tx)/reception (Rx) switching of the RS in a time domain of a subframe. A frequency domain may include a specific frequency band of the data region other than the control region for transmitting control information to the macro UE. Among radio resources allocated to the RS, a region indicated by A is a radio resource region allocated to transmit a multiplexed signal by the RS to the BS, and is included in the transmission period 100 in the time domain and is included in the data region in the frequency domain. Accordingly, when a radio resource region of the guard time is added to a radio resource region allocated for signal transmission of the RS, a resultant radio resource appears as if it is a radio resource occupied by a PUSCH allocated to one macro UE.

The macro UE and the RS can transmit signals to the BS in the allocated radio resource region by using a different multiplexing scheme. For example, the macro UE can use an SC-FDMA scheme in the PUSCHs 1, 3, and 4, and the RS can use an OFDMA scheme in the PUSCH 2. The BS can receive a signal from the macro UE by using the SC-FDMA scheme, and can receive a signal from the RS by using the OFDMA scheme. By the use of these multiplexing schemes, a gain can be obtained in terms of transmission efficiency, flexibility of resource allocation, etc.

Figure 10:
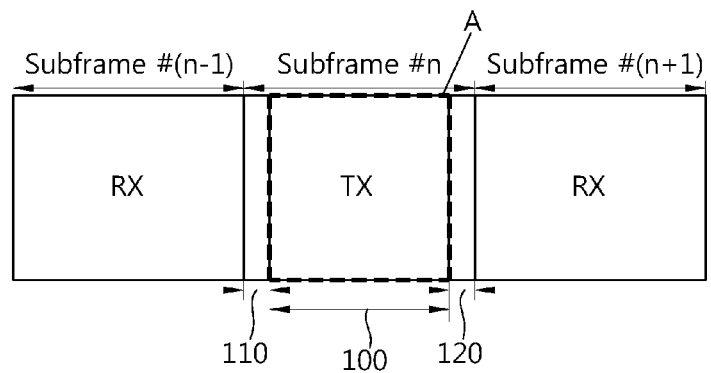
FIG. 10 shows switching of a reception mode and a transmission mode, performed by an RS.

FIG. 10 shows switching of an Rx mode and a Tx mode, performed by an RS. In FIG. 10, "RX" denotes signal reception, and "TX" denotes signal transmission. Referring to FIG. 10, the RS receives a signal from a relay UE in a subframe #(n−1), transmits the signal to a BS in a subframe #n, and receives the signal again from the relay UE in a subframe #(n+1). As such, when the RS alternatively switches the Rx mode and the Tx mode, an operation stabilization time is required depending on mode switching to avoid signal interference. Such a time is referred to guard times 110 and 120 (of course, such a guard time may be unnecessary when the RS operates in the same mode, for example, when signals are continuously received or transmitted in consecutive subframes).

The guard times 110 and 120 are included in the subframe #n in which the RS transmits the signal. The relay UE transmits the signal through the entire subframe #(n−1) or #(n+1) since instantaneous maximum power has to be decreased by increasing a signal transmission time to the maximum extent possible due to a power problem. Therefore, it is preferable that the guard time is not provided in the subframes #(n−1) and #(n+1) in which the RS receives the signal from the relay UE. Consequently, the guard times 110 and 120 are provided during at least one OFDM symbol in the subframe #n in which the RS transmits the signal (of course, the guard times 110 and 120 are unnecessary when the RS operates in the same mode, for example, when the signal is received or transmitted in all of the subframes #(n−1), #n, and #(n+1)).

Figure 11:
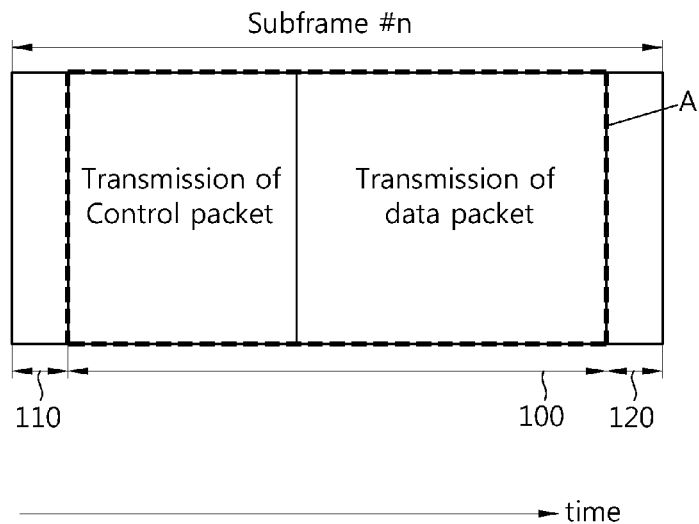
FIG. 11 shows an example of transmitting a control packet and a data packet by an RS by using different time resources among allocated radio resources.

FIG. 11 shows an example of transmitting a control packet and a data packet by an RS by using different time resources among allocated radio resources.

Referring to FIG. 11, in a time domain of an allocated radio resource A, the RS may first transmit the control packet in a transmission period 100 located between guard times 110 and 120 and thereafter transmit the data packet. The control packet and the data packet use different time resources, and thus can maintain orthogonality.

Figure 12:
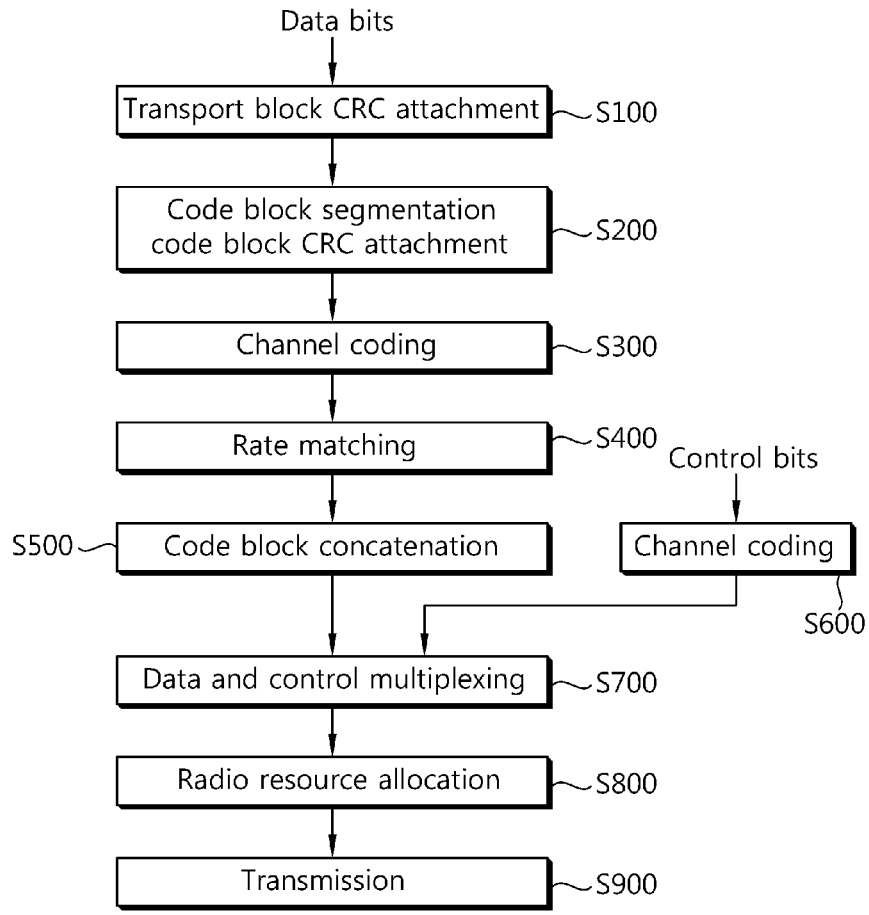
FIG. 12 is a flowchart of a multiplexing process performed by an RS to transmit control information and data.

FIG. 12 is a flowchart of a multiplexing process performed by an RS to transmit control information and data.

Referring to FIG. 12, data bits have a format of one transport block in every TTI. First, cyclic redundancy check (CRC) parity bits are attached to the data bits to generate CRC-attached bits (step S100).

The CRC-attached bits are segmented in a code block unit, and the CRC parity bits are re-attached in the code block unit (step S200). Channel coding is performed on a bit sequence obtained by performing code block segmentation (step S300). The channel-coded bits are processed with rate matching (step S400), and code block concatenation is performed (step 500) to generate a data bit sequence.

Meanwhile, control information may be multiplexed together with data. The data and the control information may use different coding rates by allocating a different number of coded symbols for transmission of the data and the control information. Channel coding is performed on the control information (step S600) to generate a control information bit sequence. The data bit sequence and the control information bit sequence are multiplexed (step S700). In the multiplexing, the control information bit sequence may be first arranged, followed by arrangement of the data bit sequence. The multiplexed sequence is allocated to a radio resource (step S800), and is then transmitted (step S900).

Figure 13:
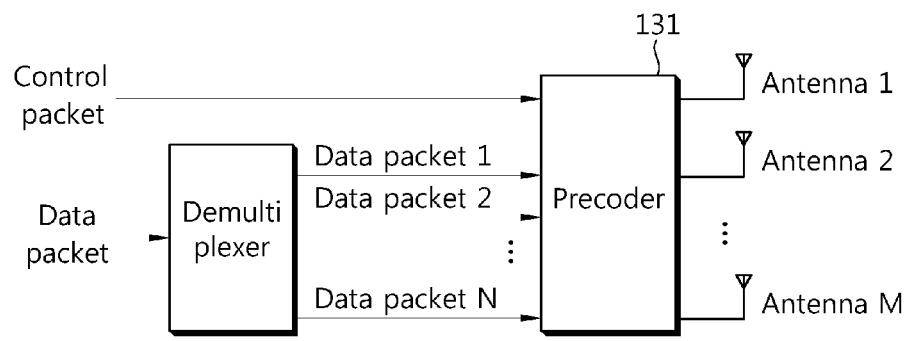
FIG. 13 is a block diagram for explaining an example of transmitting a control packet and a data packet by an RS by applying precoding.

FIG. 13 is a block diagram for explaining an example of transmitting a control packet and a data packet by an RS by applying precoding.

Referring to FIG. 13, the RS applies precoding by using a precoder 131 while allowing a control packet and a data packet to use the same time resource and frequency resource, and thereafter transmits the resultant signal through a plurality of antennas 1 to M. Since the data packet has a greater size than the control packet in general, precoding may be applied after demultiplexing a plurality of data packets 1 to N by using a demultiplexer.

A method of transmitting a signal by an RS to a BS has been described above. Hereinafter, a method of transmitting a signal by a BS in a wireless communication system employing an RS will be described. In the following description, when the BS transmits a signal, control information may imply a communication control related signal such as ACK/NACK to be transmitted by the BS to the RS, a response on a scheduling request signal, radio resource allocation information, etc., and data may imply user data, that is, a signal other than the control information.

The BS first allocates a radio resource for transmitting a signal to the RS or a macro UE. Then, the BS transmits the signal to the RS and the macro UE by using the allocated radio resource. In this case, in a time domain of a subframe including a transmission period and a guard time corresponding to a period for Tx/Rx switching of the RS, the RS is allocated with a radio resource including the transmission period, and the macro UE is allocated with a radio resource including the guard time. The BS may transmit a first signal to the RS by using the allocated radio resource, and may transmit a second signal to the macro UE.

Figure 14:
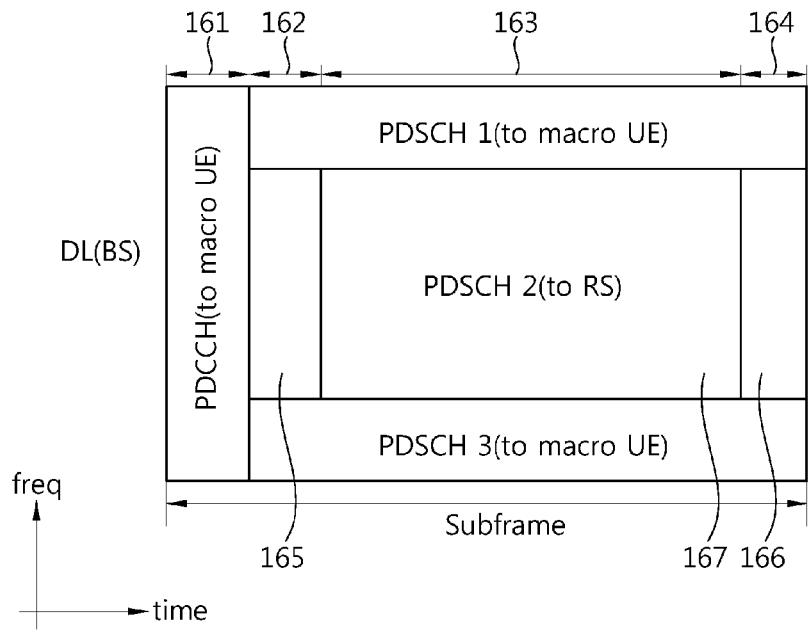
FIG. 14 shows an example of allocating a radio resource in a subframe in which a BS transmits a signal to a macro UE and an RS.

FIG. 14 shows an example of allocating a radio resource in a subframe in which a BS transmits a signal to a macro UE and an RS.

Referring to FIG. 14, control information is transmitted to the macro UE in at least one OFDM symbol 161 located in a start part of the subframe (a region for transmitting control information to the macro UE is indicated by "PDCCH (to macro UE)" in FIG. 14). The control information includes radio resource allocation information regarding radio resource regions 165 and 166 for transmitting data to the macro UE. The radio resource regions 165 and 166 may include a guard time of the RS in a time domain.

The BS transmits a first signal to the RS by using a radio resource 167 which is a consecutive specific band in a frequency domain and which includes a transmission period 163 in the time domain. In this case, the first signal may include both control information and data, each of which can be transmitted in a format of a control packet and a data packet.

Although it is shown in FIG. 14 that the BS transmits the first signal to the RS by using the radio resource 167 having one frequency band, the present invention is not limited thereto, and thus transmission can be performed by using a plurality of separate frequency bands. In this case, at least any one of the plurality of frequency bands may be a frequency band pre-defined in consideration of a relation with the RS.

Figure 15:
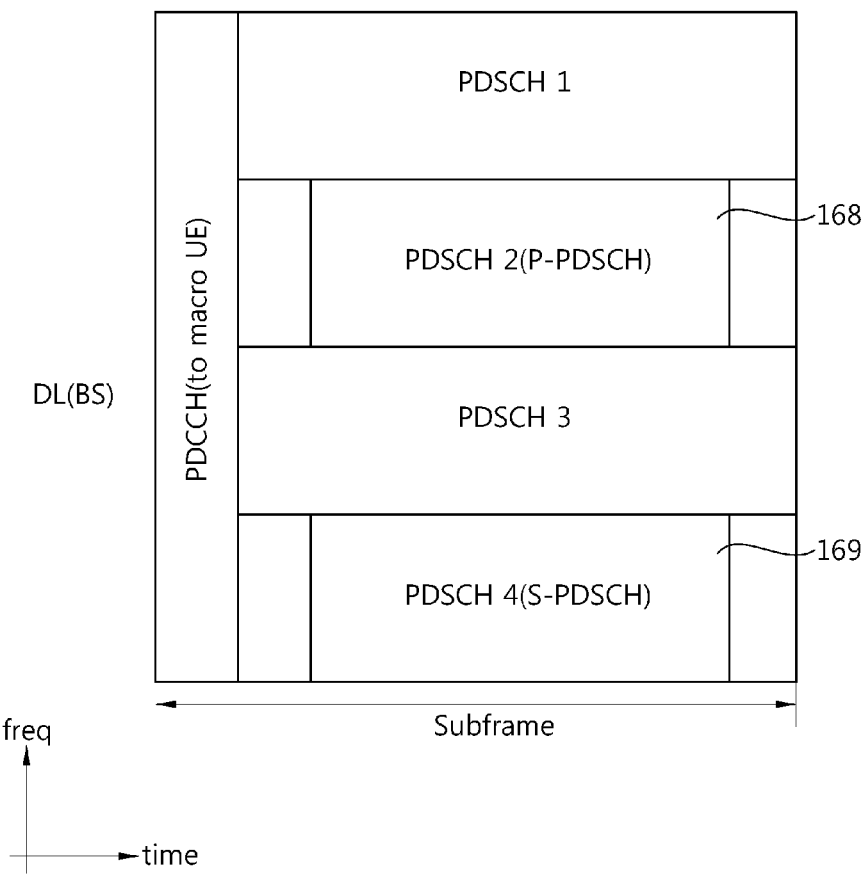
FIG. 15 shows an example of transmitting a signal by a BS to one RS by using a plurality of frequency bands.

FIG. 15 shows an example of transmitting a signal by a BS to one RS by using a plurality of frequency bands.

Referring to FIG. 15, the BS transmits a signal to the RS by using radio resources 168 and 169 indicated by a "PDSCH 2(P-PDSCH)" and a "PDSCH 4(S-PDSCH)" (hereinafter, respectively abbreviated to a PDSCH 2 and a PDSCH 4). In this case, control information (e.g., radio resource allocation information) may exist in each of the PDSCHs 2 and 4, or may exist in only one PDSCH, e.g., the PDSCH 2.

When the control information exists only in one PDSCH, for convenience of explanation, a PDSCH (e.g., PDSCH 2) having the control information is referred to as a primary (P)-PDSCH, and the other PDSCH (e.g., PDSCH 4) other than the P-PDSCH is referred to as a secondary (S)-PDSCH.

A location of the P-PDSCH and a radio resource to be used may be pre-defined between the BS and the RS. The P-PDSCH (or a radio resource allocated to a control packet included in the P-PDSCH) may be designed to have a fixed format, location, and radio resource. For example, the P-PDSCH may be fixed in a semi-static manner. Alternatively, the P-PDSCH may be designed to have a several number of limited formats, locations, and radio resources to facilitate blind decoding. The RS can obtain control information and data included in the P-PDSCH by performing blind decoding.

According to the aforementioned example, the RS can directly decode the P-PDSCH without depending on an additional control channel (e.g., PDCCH). Further, the location of the S-PDSCH and information on the radio resource may be included in control information (i.e., radio resource allocation information) of the P-PDSCH. As a result, the S-PDSCH may exist in various locations in comparison with the P-PDSCH.

That is, the BS may split a subframe including a transmission period and a guard time in a time domain into a plurality of frequency bands in a frequency domain, and may transmit control information and first data to the RS by using a transmission period belonging to a first frequency band which is any one of the plurality of frequency bands. In addition, second data can be transmitted to the RS by using a transmission period belonging to a second frequency band indicated by the control information.

Figure 16:
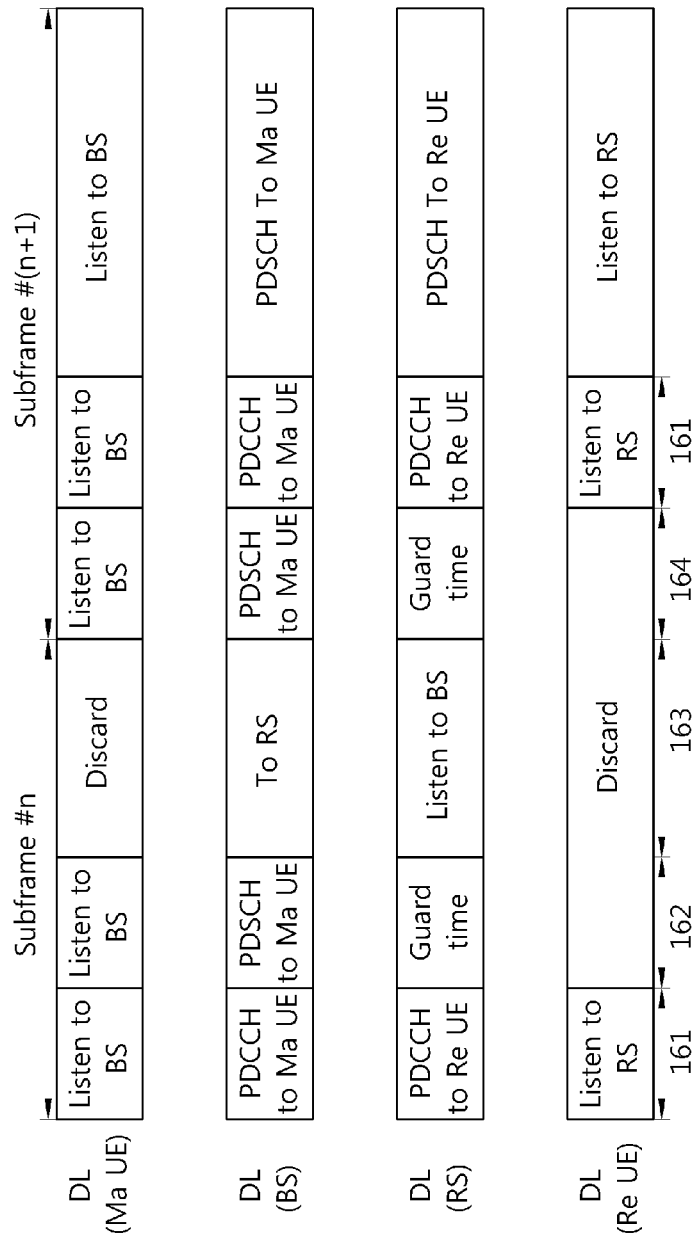
FIG. 16 shows an operation of a BS, an RS, and a macro UE in a time domain when the BS transmits a signal to the RS or the macro UE.

FIG. 16 shows an operation of a BS, an RS, and a macro UE in a time domain when the BS transmits a signal to the RS or the macro UE.

Referring to FIG. 16, during a first period 161 corresponding to a specific number of OFDM symbols of a subframe #n, the BS transmits control information to the macro UE (i.e., Ma UE), and the RS transmits the control information to a relay UE (i.e., Re UE). The number of OFDM symbols for transmitting the control information may be equal or different between the BS and the RS.

The BS transmits a second signal to the Ma UE during OFDM symbol periods 162 and 164 which correspond to a guard time from the perspective of the RS. The second signal may be data such as user data. During the OFDM symbol periods 162 and 164, the RS does not perform decoding. The BS transmits a first signal (e.g., control information and/or data) to the RS in an OFDM symbol period 163 other than the guard time in the subframe.

The first signal transmitted by the BS to the RS includes a reference signal. In this case, the reference signal may be a dedicated reference signal. The Ma UE decodes a signal transmitted from the BS by using a radio resource corresponding to a guard time of the RS. In this case, the reference signal used for the RS or a cell-specific reference signal may be used.

Hereinafter, an example of transmitting data by the BS to the Ma UE by using the radio resource corresponding to the guard time from the perspective of the RS will be described. Although a case of using a normal cyclic prefix having 14 OFDM symbols in one subframe will be described below for example, it is apparent that the present invention can also apply to a case of using an extended cyclic prefix having 12 OFDM symbols in one subframe.

FIG. 17 to FIG. 20 show examples of transmitting data by a BS to a macro UE by using a radio resource configured as a guard time from the perspective of an RS. The data may be user data.

Referring to FIG. 17 to FIG. 20, the BS maps data $S_1$ to data $S_k$ to radio resources 191 and 192 (hereinafter, abbreviated to a PDSCH 4 and a PDSCH 5) configured as a guard time, and then transmits the mapped data to the macro UE.

Figure 19:
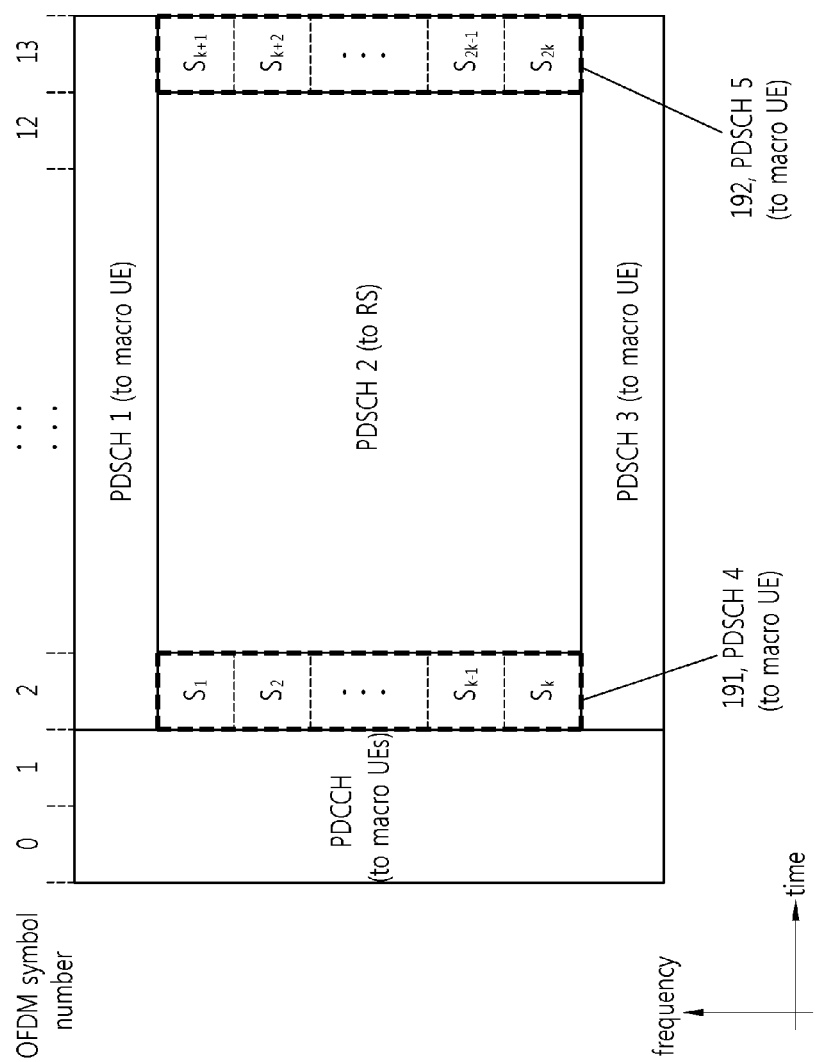
Figure 20:
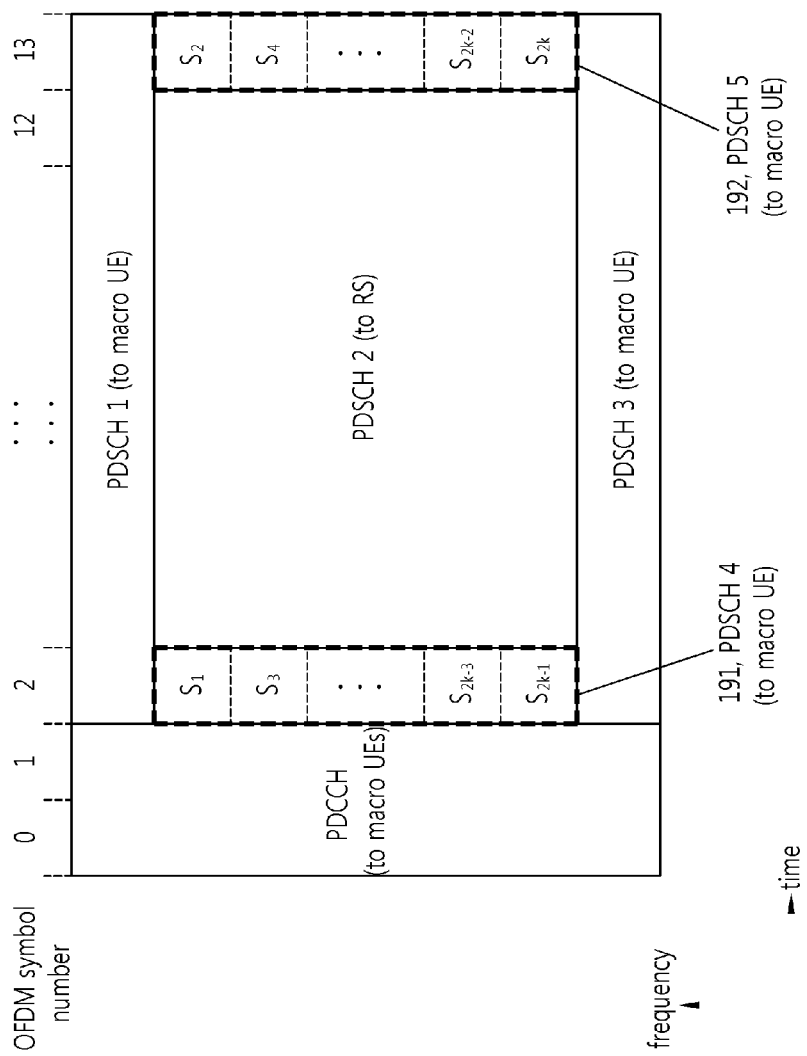

In particular, FIG. 19 shows an example in which the data $S_1$ to the data $S_k$ are sequentially mapped in a frequency order to resource elements of a region 191 corresponding to the PDSCH 4, and thereafter data $S_{k+1}$ to data $S_{2k}$ are sequentially mapped in a frequency order in a region 192 corresponding to the PDSCH 5. On the other hand, FIG. 20 shows an example in which data is mapped first in a time order (e.g., the data $S_1$ is mapped to the region 191 corresponding to the PDSCH 4, and then the data $S_2$ is mapped to the region 192 corresponding to the PDSCH 5), and then the remaining part of data are mapped in a frequency order. In FIG. 19 and FIG. 20, data is mapped to OFDM symbol numbers 2 and 13.

Although it has been described above with reference to FIG. 17 to FIG. 20 that the PDCCH transmitted by the BS includes two OFDM symbols and the PDSCHs 4 and 5 (i.e., radio resources corresponding to a guard time of the RS) each include one OFDM symbol, this is for exemplary purposes only and the present invention is not limited thereto. Thus, various modifications can be made in the PDSCHs 4 and 5 when the PDCCH transmitted by the BS and the guard time of the RS have a different number of OFDM symbols.

Figure 21:
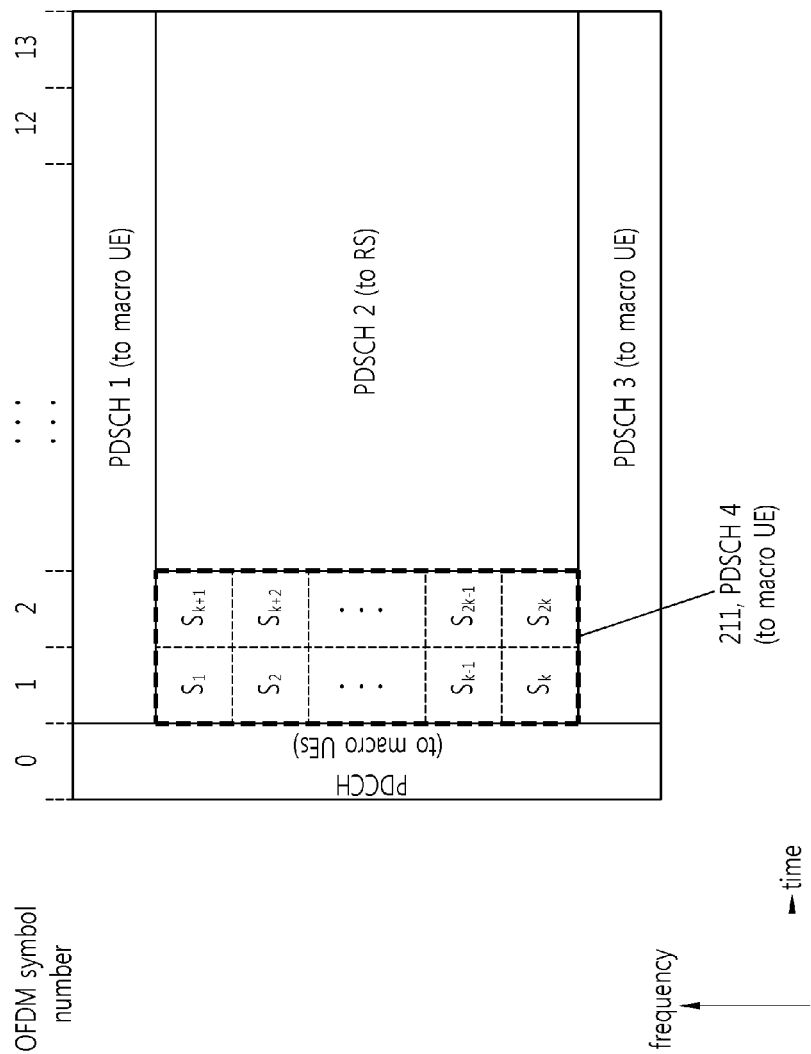
FIG. 21 and FIG. 22 show examples in which a BS transmits data to a macro UE when a physical downlink control channel (PDCCH) has one orthogonal frequency division multiplexing (OFDM) symbol and a physical downlink shared channel (PDSCH) 4 has two OFDM symbols.
Figure 22:
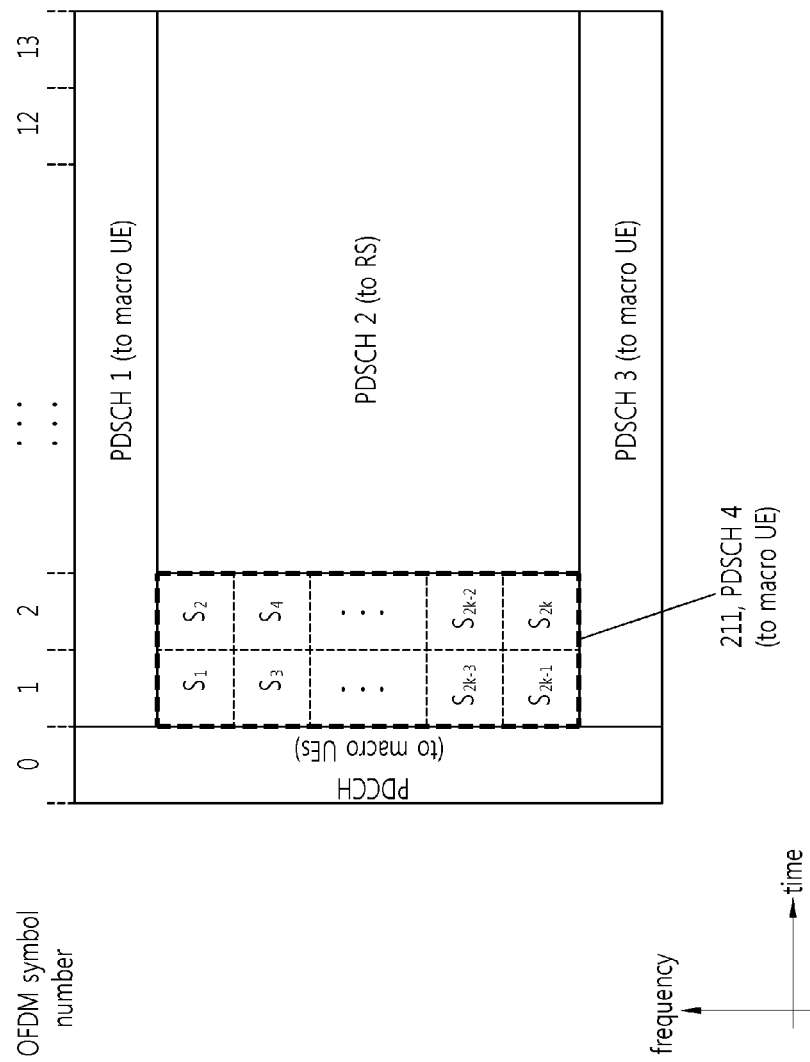

FIG. 21 and FIG. 22 show examples in which a BS transmits data to a macro UE when a PDCCH has one OFDM symbol and a PDSCH 4 has two OFDM symbols.

Referring to FIG. 21, the BS maps data $S_1$ to data $S_k$ in a frequency order to resource elements in a first OFDM symbol time of a region 211 corresponding to the PDSCH 4, and thereafter maps data $S_{k+1}$ to data $S_{2k}$ in a frequency order to resource elements in a second OFDM symbol time. Referring to FIG. 22, the BS maps data $S_1$ and data $S_2$ to resource elements, for example, having a highest frequency in a first OFDM symbol time and a second OFDM symbol time in a region 211 corresponding to the PDSCH 4, and sequentially maps data $S_3$ and data $S_4$ to resource elements having a next highest frequency. That is, data is mapped first in a time order and is then mapped in a frequency order. In FIG. 21 and FIG. 22, data is mapped to OFDM symbol numbers 1 and 2.

Figure 23:
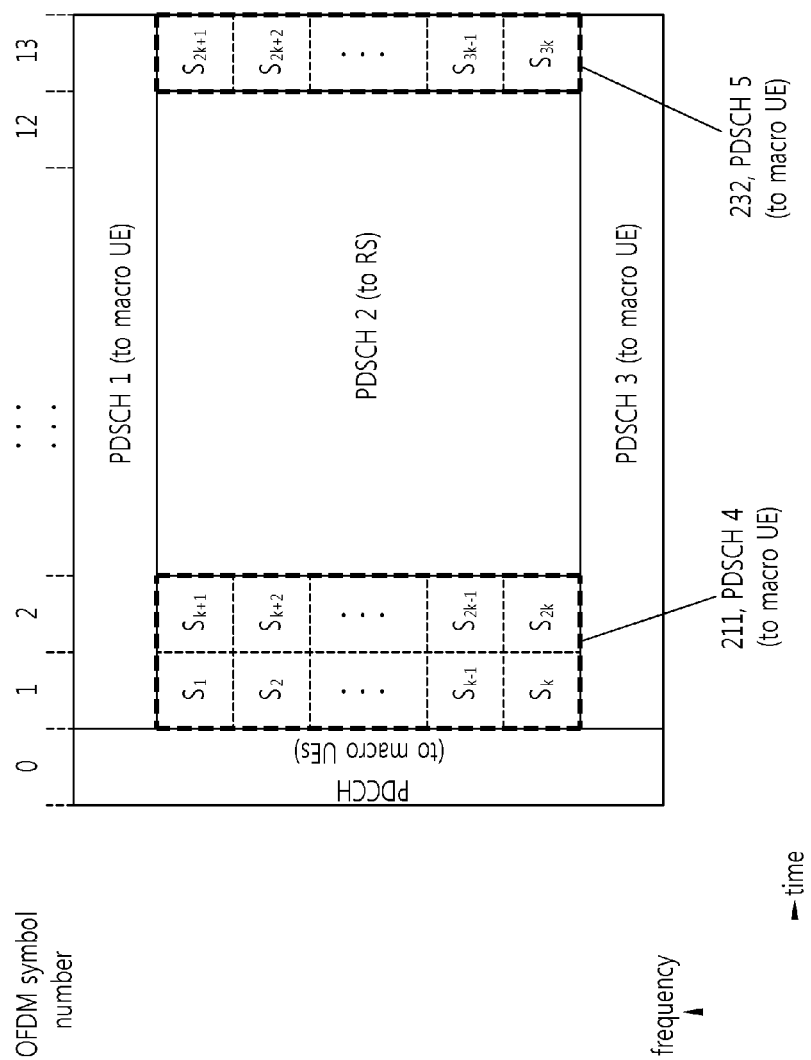
FIG. 23 and FIG. 24 show examples in which a BS transmits data to a macro UE when a PDCCH allocated for the macro UE has one OFDM symbol, a PDSCH 4 has two OFDM symbols, and a PDSCH 5 has one OFDM symbol.
Figure 24:
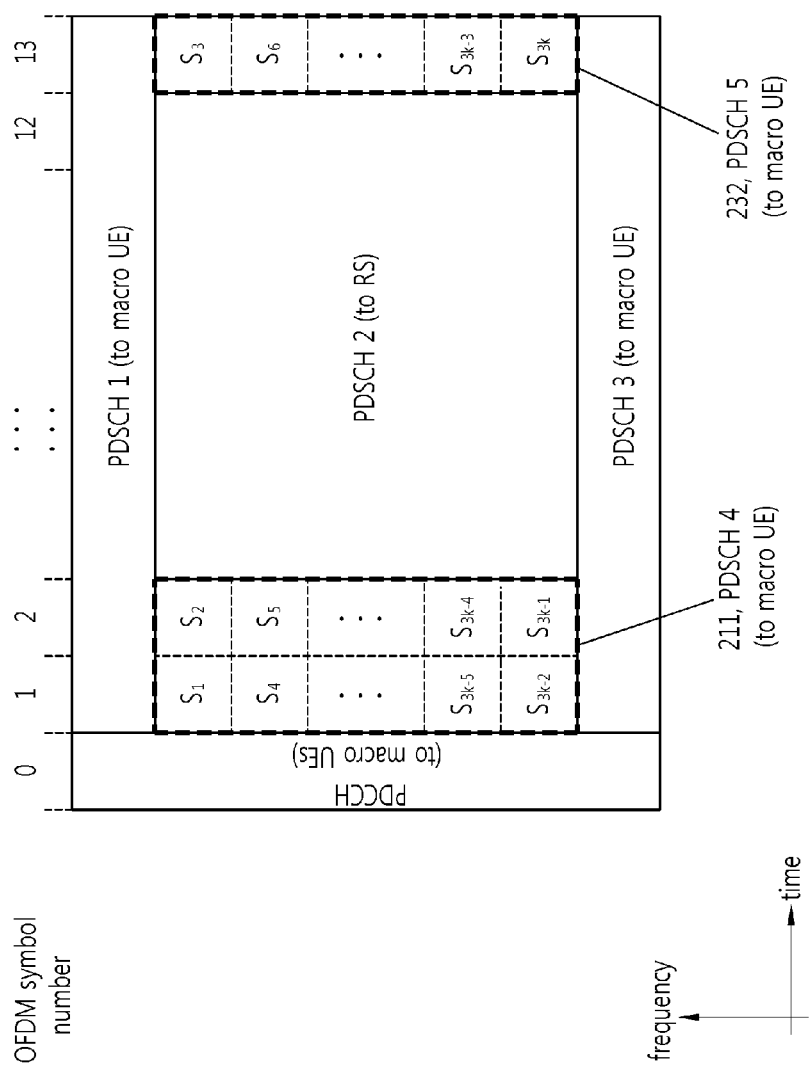

FIG. 23 and FIG. 24 show examples in which a BS transmits data to a macro UE when a PDCCH allocated for the macro UE has one OFDM symbol, a PDSCH 4 has two OFDM symbols, and a PDSCH 5 has one OFDM symbol.

Referring to FIG. 23, the BS maps data $S_1$ to data $S_k$ in a frequency order to resource elements in a first OFDM symbol in a region 211 corresponding to the PDSCH 4, and thereafter maps data $S_{k+1}$ to data $S_{2k}$ in a frequency order to resource elements in a second OFDM symbol. In addition, the BS maps data $S_{2k+1}$ and data $S_{3k}$ in a frequency order to resource elements in a region 232 corresponding to the PDSCH 5. Referring to FIG. 24, the BS first maps data $S_1$ to data $S_3$ in a time order to resource elements in regions corresponding to the PDSCH 4 and the PDSCH 5, and then maps the remaining parts of data to resource elements having a low frequency in the same manner. In FIG. 23 and FIG. 24, data is mapped to OFDM symbol numbers 1, 2, and 13.

Figure 25:
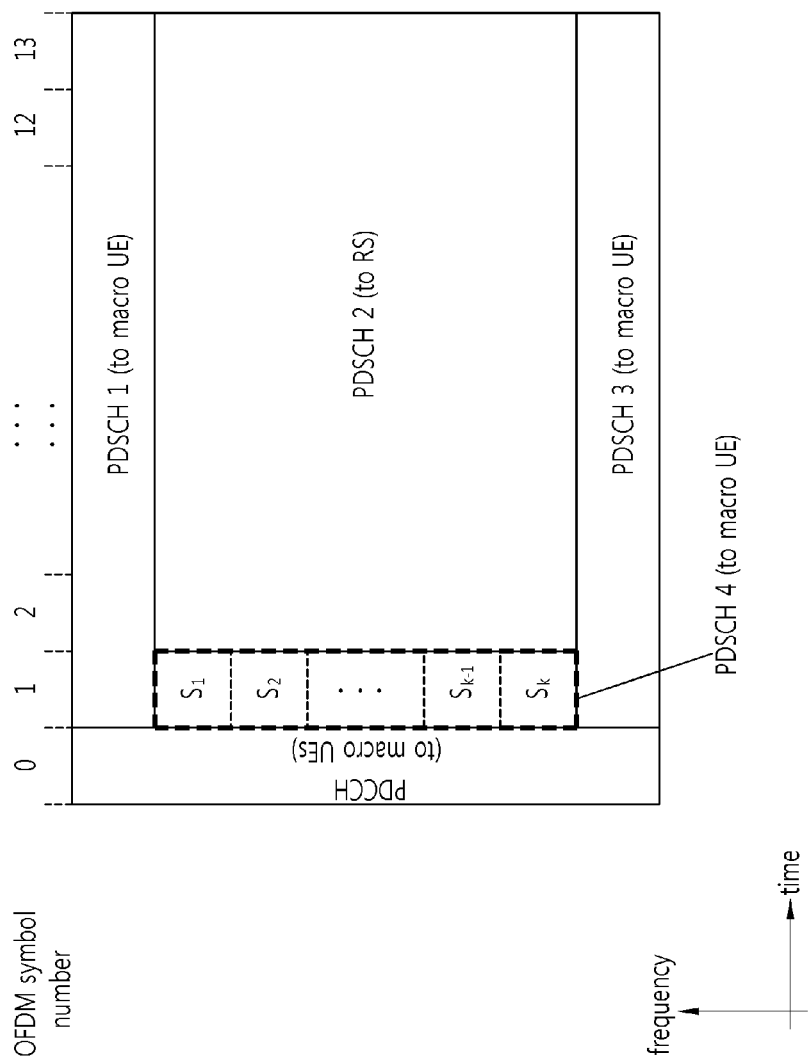
FIG. 25 to FIG. 27 show examples in which a BS transmits data to a macro UE when a PDCCH allocated for the macro UE has one OFDM symbol and a PDSCH 4 or a PDSCH 5 has one OFDM symbol.
Figure 26:
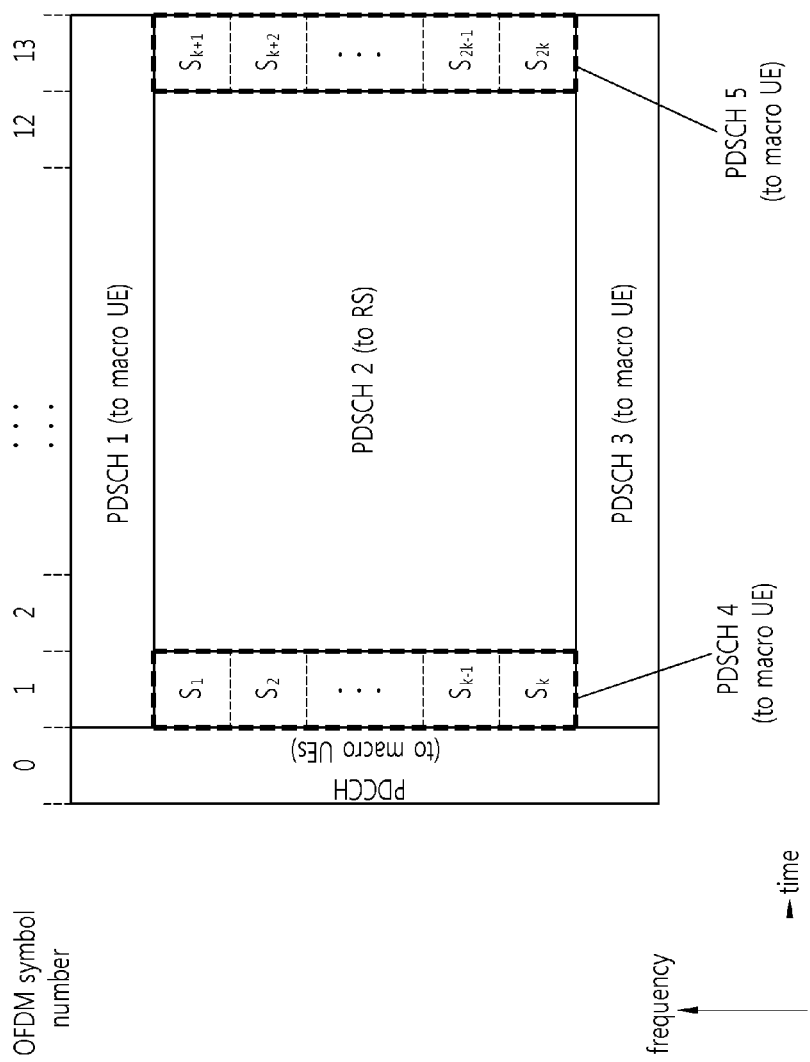
Figure 27:
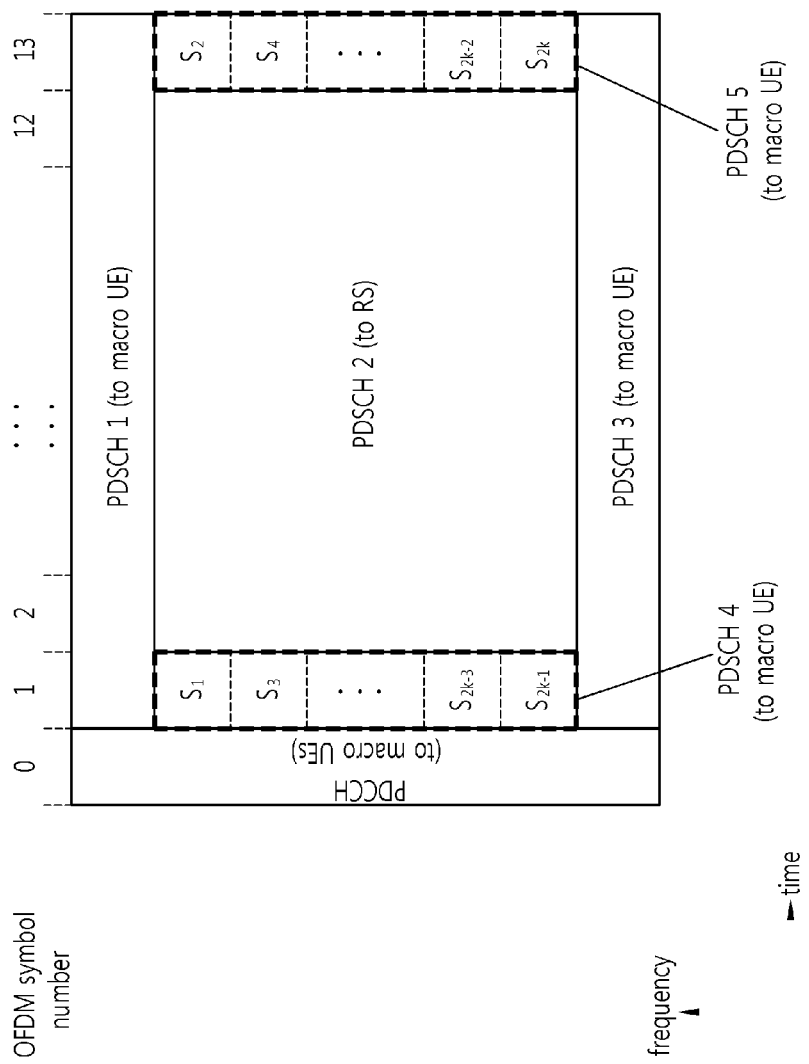

FIG. 25 to FIG. 27 show examples in which a BS transmits data to a macro UE when a PDCCH allocated for the macro UE has one OFDM symbol and a PDSCH 4 or a PDSCH 5 has one OFDM symbol.

FIG. 25 shows an example in which data $S_1$ to data $S_k$ are transmitted to the macro UE by being mapped in a frequency order to resource elements only in a PDSCH 4. FIG. 26 shows an example in which data $S_1$ to data $S_k$ and data $S_{k+1}$ to $S_{2k}$ are mapped in a frequency order to resource elements in a PDSCH 4 and a PDSCH 5. FIG. 27 shows an example in which data is first mapped in a time order to resource elements having the same frequency among resource elements belonging to a PDSCH 4 and a PDSCH 5 and is then mapped in a frequency order. In FIG. 25, data is mapped to an OFDM symbol number 1. In FIG. 26 and FIG. 27, data is mapped to OFDM symbol numbers 1 and 13.

The BS can transmit radio resource allocation information to the macro UE. The radio resource allocation information one-to-one corresponds to each method described with reference to FIG. 17 to FIG. 27. For example, the radio resource allocation information may include information for reporting a location of a guard time in a subframe or information for instructing puncturing of a transmission period.

The information for reporting the location of the guard time may be configured by adding a new field consisting of a symbol allocation bitmap (3 bits) to a conventional DCI format. The symbol allocation bitmap can be expressed by Table 2 with respect to the methods described with reference to FIG. 17 to FIG. 24. In Table 2, the method described with reference to FIG. 17 is simply referred to as 'FIG. 17' for convenience of explanation.

TABLE 2

Figure 17:
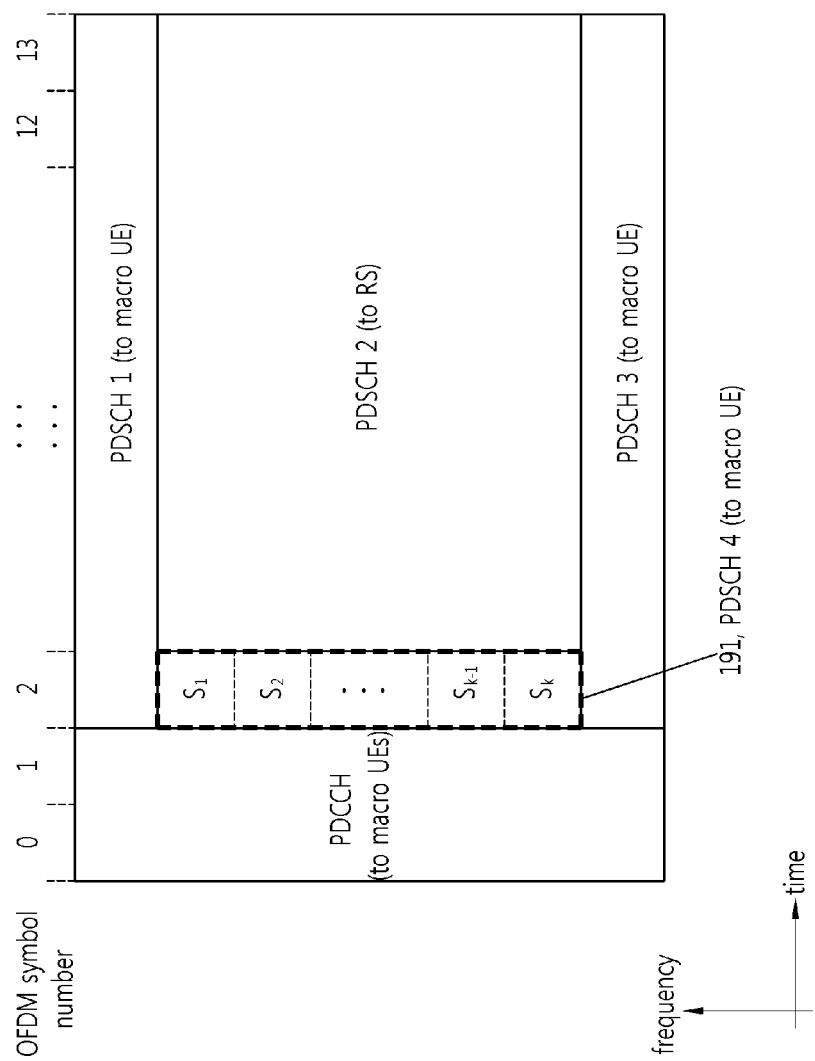
FIG. 17 to FIG. 20 show examples of transmitting data by a BS to a macro UE by using a radio resource configured as a guard time from the perspective of an RS.
Figure 18:
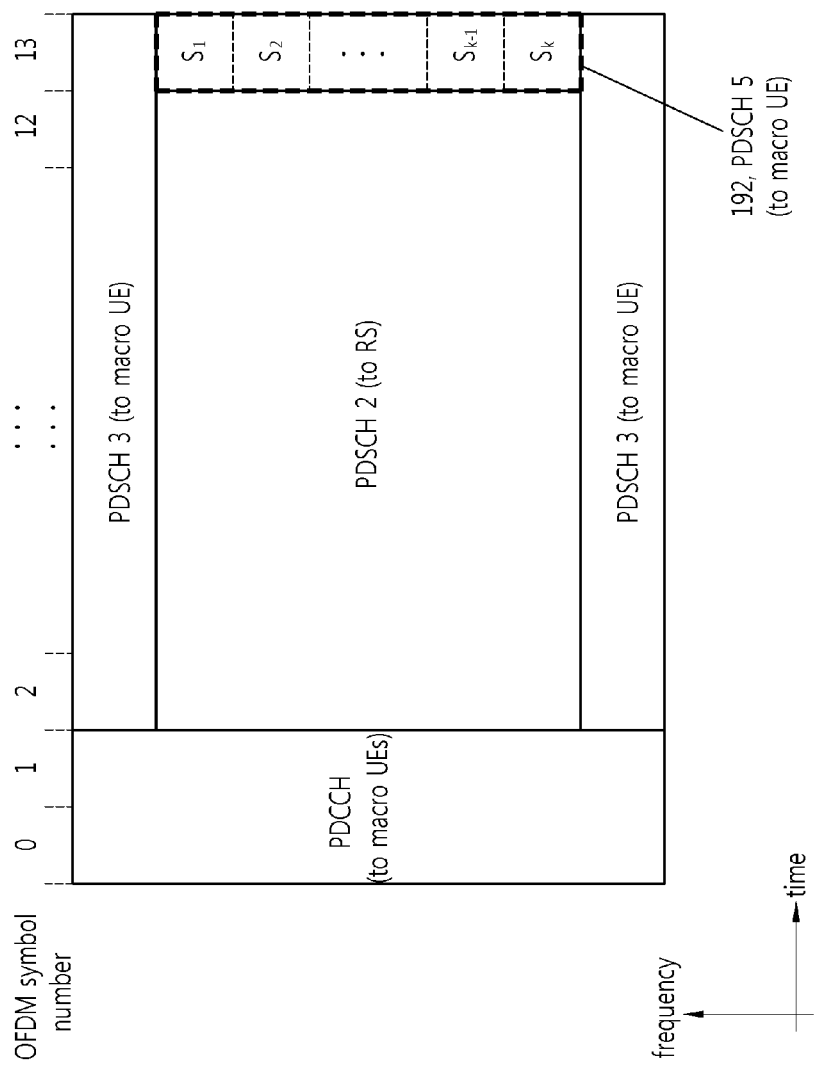

| symbol allocation bitmap | 001 | 010 | 011 | 110 | 111 |
|---|---|---|---|---|---|
| exemplary allocation | FIG. 18 | FIG. 17 | FIG. 19 or FIG. 20 | FIG. 21 or FIG. 22 | FIG. 23 or FIG. 24 |

In Table 2, a first bit of the symbol allocation bitmap may indicate an OFDM symbol number 1, a second bit thereof may indicate an OFDM symbol number 2, and a third bit thereof may indicate an OFDM symbol number 13. The macro UE can know a location of a guard time by using the symbol allocation bitmap.

When a 2-bit symbol allocation bitmap is added as a new field, it can be expressed by Table 3 below. In this case, a first bit indicates an OFDM symbol number 2 of a subframe and a second bit thereof indicates an OFDM symbol number 13.

TABLE 3

| symbol allocation bitmap | 01 | 10 | 11 |
|---|---|---|---|
| exemplary allocation | FIG. 18 | FIG. 17 | FIG. 19 or FIG. 20 |

Alternatively, a first bit of the symbol allocation bitmap may indicate an OFDM symbol number 1 of a subframe, a second bit thereof may indicate an OFDM symbol number 13. In this case, the symbol allocation bitmap is expressed by Table 4 below.

TABLE 4

| symbol allocation bitmap | 01 | 10 | 11 |
|---|---|---|---|
| exemplary allocation | FIG. 18 | FIG. 25 | FIG. 26 or FIG. 27 |

In a case described below, the radio resource allocation information is information for instructing puncturing of a transmission period. Referring back to FIG. 14, the BS may instruct the macro UE to include the transmission period 163 and the guard times 162 and 164 in the time domain and to allocate a radio resource having a specific frequency band (i.e., a radio resource including the periods 165, 166, and 167). Thereafter, the BS may instruct the macro UE to decode only an OFDM symbol corresponding to the guard times 162 and 164 while puncturing an OFDM symbol corresponding to the transmission period 163 in the specific frequency band.

The method of transmitting a signal by a BS in a wireless communication system employing an RS may apply, for example, when UL/DL band swapping is used between the BS and the RS. The UL/DL band swapping implies that the BS transmits a signal to the RS by using a UL frequency band in a specific subframe in an FDD mode.

FIG. 28 shows an example of UL/DL band swapping.

Referring to FIG. 28, a BS transmits a signal to an RS in a subframe 4 belonging to a UL frequency band. In this case, the subframe 4 is referred to as a swapped subframe. When the BS transmits a signal to the RS in the swapped subframe, a control packet may include scheduling information regarding signal transmission from the RS to the BS and scheduling information regarding next signal transmission from the BS to the RS. The aforementioned P-PDSCH and S-PDSCH may also apply to a case where the BS transmits a signal to the RS in a UL band by using the UL/DL band swapping. That is, when the BS performs UL/DL band swapping to transmit the signal to the RS by configuring two or more PUSCHs in the UL frequency band, one PUSCH may be the P-PUSCH and the other PUSCH may be the S-PUSCH. "3GPP R1-084206, UL/DL band swapping for efficient support of relays in FDD mode, LG Electronics" may be incorporated by reference for the purpose of explaining the UL/DL band swapping.

In addition, the aforementioned method of transmitting the signal by the BS in the wireless communication system employing the RS may also apply to a case where the RS receives a signal from the BS by using a multicast/broadcast single frequency network (MBSFN) subframe.

Figure 29:
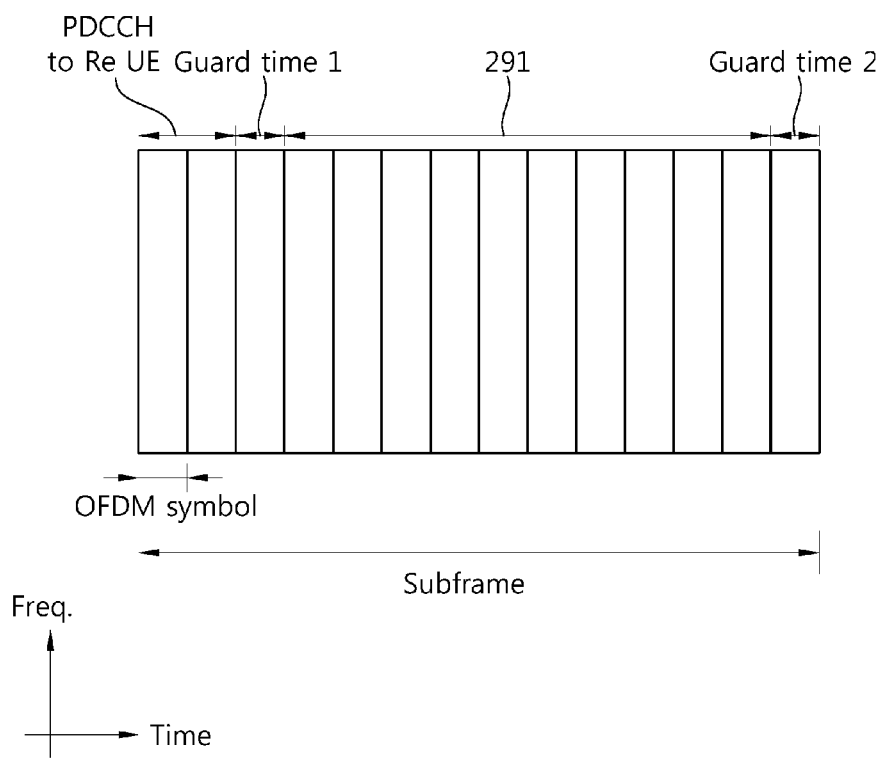
FIG. 29 shows a multicast/broadcast single frequency network (MBSFN) subframe in which an RS receives a signal from a BS.

FIG. 29 shows an MBSFN subframe in which an RS receives a signal from a BS.

Referring to FIG. 29, the RS transmits control information of control channels (i.e., PCFICH, PDCCH, and PHICH) to a relay UE in a specific number of OFDM symbol periods (e.g., 2 OFDM symbol periods) of the MBSFN subframe. The control information reports that DL data is not transmitted to the relay UE. Thus, the control information can be used to prevent relay UEs from unnecessary data reception or reference signal measurement. The RS can receive a signal from the BS in a subframe period 291 other than guard times 1 and 2.

Figure 30:
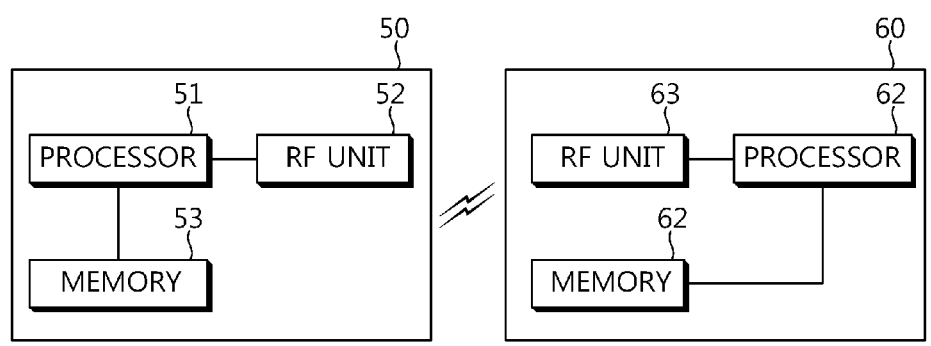
FIG. 30 is a block diagram of a BS and an RS according to an embodiment of the present invention.

FIG. 30 is a block diagram of a BS and an RS according to an embodiment of the present invention.

Referring to FIG. 30, a BS 50 includes a processor 51, a memory 53, and a radio frequency (RF) unit 52. The processor 51 splits a subframe including a transmission period and a guard time for Tx/Rx switching of the RS into a first frequency band and a second frequency band in a frequency domain, and transmits radio resource allocation information to the RS through the transmission period belonging to the first frequency band. Further, user data is transmitted to the RS through the transmission period belonging to a second frequency band indicated by the radio resource allocation information. Alternatively, the processor 51 may transmit a first signal to the RS through the transmission period by using the RF unit 52 in a subframe including the transmission period and the guard time for Tx/Rx switching of the RS, and may transmit a second signal to a macro UE through the guard time. Layers of a radio interface protocol can be implemented by the processor 51. The memory 53 is coupled to the processor 51, and stores a variety of information for operating the processor 51. The RF unit 52 is coupled to the processor 51, and transmits and/or receives a radio signal.

An RS 60 includes a processor 61, a memory 62, and an RF unit 63. The processor 61 generates a multiplexed signal by multiplexing data and control information to be transmitted to the BS 50, and transmits the multiplexed signal by using a radio resource in a subframe indicated by radio resource allocation information received from the BS 50. The subframe includes a transmission period and a guard time for Tx/Rx switching of the RS in a time domain. The radio resource is included in the transmission period.

The processors 51 and 61 may include an application-specific integrated circuit (ASIC), a separate chipset, a logic circuit, and/or a data processing unit. The memories 52 and 62 may include a read-only memory (ROM), a random access memory (RAM), a flash memory, a memory card, a storage medium, and/or other equivalent storage devices. The RF units 53 and 63 may include a base-band circuit for processing a radio signal. When the embodiment of the present invention is implemented in software, the aforementioned methods can be implemented with a module (i.e., process, function, etc.) for performing the aforementioned functions. The module may be stored in the memories 52 and 62 and may be performed by the processors 51 and 61. The memories 52 and 62 may be located inside or outside the processors 51 and 61, and may be coupled to the processors 51 and 61 by using various well-known means.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method for monitoring control channels by a relay node (RN), the method comprising:
receiving a multicast/broadcast single frequency network (MBSFN) configuration from a base station (BS), the MBSFN configuration indicating at least one BS-to-RN subframe among a plurality of subframes, the at least one BS-to-RN subframe being used for communication from the BS to the RN, the at least one BS-to-RN subframe including a first slot and a second slot in a time domain, wherein the first slot and the second slot are consecutive in the time domain;
receiving a configuration message from the BS, the configuration message indicating a start location of a downlink (DL) control channel in the at least one BS-to-RN subframe;
monitoring the DL control channel intended for the RN at the first slot of the at least one BS-to-RN subframe based on the configuration message, the DL control channel including a downlink resource assignment and being demodulated using a dedicated reference signal (RS) transmitted in the first slot of the at least one BS-to-RN subframe;

receiving downlink data on a DL data channel indicated by the downlink resource assignment at the second slot of the at least one BS-to-RN subframe when the downlink resource assignment is detected on the DL control channel.

2. The method of claim 1, wherein the downlink resource assignment on the DL control channel is obtained by blind decoding.

3. The method of claim 1, wherein when the downlink resource assignment is received in a first frequency band at the first slot of the at least one BS-to-RN subframe, the DL data channel is received in the first frequency band at the second slot of the at least one BS-to-RN subframe.

4. A relay node (RN) comprising:
a radio frequency (RF) unit configured to transmit and receive a radio signal; and
a processor coupled to the RF unit and being configured to:
receive a multicast/broadcast single frequency network (MBSFN) configuration from a base station (BS), the MBSFN configuration indicating at least one BS-to-RN subframe among a plurality of subframes, the at least one BS-to-RN subframe being used for communication from the BS to the RN, the at least one BS-to-RN subframe including a first slot and a second slot in a time domain, wherein the first slot and the second slot are consecutive in the time domain;
receive a configuration message from the BS, the configuration message indicating a start location of a downlink (DL) control channel in the at least one BS-to-RN subframe;
monitor the DL control channel intended for the RN at the first slot of the at least one BS-to-RN subframe based on the configuration message, the DL control channel including a downlink resource assignment and being demodulated using a dedicated reference signal (RS) transmitted in the first slot of the at least one BS-to-RN subframe;
receive downlink data on a DL data channel indicated by the downlink resource assignment at the second slot of the at least one BS-to-RN subframe when the downlink resource assignment is detected on the DL control channel.

5. The RN of claim 4, wherein the downlink resource assignment on the DL control channel is obtained by blind decoding.

6. The RN of claim 4, wherein when the downlink resource assignment is received in a first frequency band at the first slot of the at least one BS-to-RN subframe, the DL data channel is received in the first frequency band at the second slot of the at least one BS-to-RN subframe.

7. The method of claim 1, wherein when each of the at least one BS-to-RN subframe comprises 14 orthogonal frequency division multiplexing (OFDM) symbols or 12 OFDM symbols, the start location of the DL control channel is a third OFDM symbol or a fourth OFDM symbol.

8. The RN of claim 4, wherein when each of the at least one BS-to-RN subframe comprises 14 orthogonal frequency division multiplexing (OFDM) symbols or 12 OFDM symbols, the start location of the DL control channel is a third OFDM symbol or a fourth OFDM symbol.

* * * * *